(12) United States Patent
Chervyakov et al.

(10) Patent No.: US 11,871,436 B2
(45) Date of Patent: Jan. 9, 2024

(54) APPARATUS FOR UE MEASUREMENT DELAY AND GRANULARITY FOR NEW RADIO POSITIONING MEASUREMENT

(71) Applicant: Intel Corporation, Santa Clara, CA (US)

(72) Inventors: Andrey Chervyakov, Nizhny Novgorod (RU); Rui Huang, Beijing (CN); Hua Li, Beijing (CN); Yi Guo, Shanghai (CN); Qiming Li, Beijing (CN)

(73) Assignee: Intel Corporation, Santa Clara, CA (US)

(*) Notice: Subject to any disclaimer, the term of this patent is extended or adjusted under 35 U.S.C. 154(b) by 160 days.

(21) Appl. No.: 17/320,942

(22) Filed: May 14, 2021

(65) Prior Publication Data

US 2021/0329618 A1 Oct. 21, 2021

Related U.S. Application Data

(60) Provisional application No. 63/035,536, filed on Jun. 5, 2020, provisional application No. 63/025,031, filed on May 14, 2020.

(51) Int. Cl.
*H04W 72/00* (2023.01)
*H04W 72/51* (2023.01)
*H04L 5/00* (2006.01)
*H04W 56/00* (2009.01)
*H04W 72/54* (2023.01)

(52) U.S. Cl.
CPC .......... *H04W 72/51* (2023.01); *H04L 5/0051* (2013.01); *H04W 56/006* (2013.01); *H04W 72/54* (2023.01)

(58) Field of Classification Search
CPC ......... H04M 2242/30; H04M 3/42348; H04W 4/02–029
See application file for complete search history.

(56) References Cited

FOREIGN PATENT DOCUMENTS

WO WO-2021206468 A1 * 10/2021

OTHER PUBLICATIONS

ETSI TS 138 133 V15.9.0 (Apr. 2020), ETSI Technical Specification for 5G NR requirements for support of radio resource management (3GPP TS 38.133 version 15.9.0 Release 15), hereinafter ETSI TS 138 133 V15.9.0. (Year: 2020).*

* cited by examiner

*Primary Examiner* — Ronald Eisner
(74) *Attorney, Agent, or Firm* — Alliance IP, LLC

(57) ABSTRACT

An apparatus of a New Radio (NR) Node B (gNB), a method, and a storage medium. One or more processors of the apparatus are to: encode for transmission to a user equipment (UE) a message to configure the UE with a measurement gap pattern for positioning reference signal (PRS) measurements; and set a gap pattern length of a measurement gap corresponding to the measurement gap pattern depending on whether an overlap exists between a PRS to be measured and one or more other NR data scheduled to be received by the UE.

25 Claims, 8 Drawing Sheets

APPARATUS FOR UE MEASUREMENT DELAY AND GRANULARITY FOR NEW RADIO POSITIONING MEASUREMENT

CROSS REFERENCE TO RELATED APPLICATIONS

This application claims the benefit of and priority from U.S. Provisional Patent Application No. 63/035,536 entitled "USER EQUIPMENT CAPABILITY FOR NEW RADIO POSITION MEASUREMENT GRANULARITY," filed Jun. 7, 2020, and from U.S. Provisional Patent Application No. 63/025,031 entitled "UE MEASUREMENT DELAY FOR NR POSITIONING MEASUREMENT," filed May 14, 2020.

FIELD

Various embodiments generally may relate to the field of wireless communications in a cellular network.

BACKGROUND

Various embodiments generally may relate to the field of wireless communications, and especially to location measurements using positioning reference signal (PRS) measurements in a New Radio (NR) network. For PRS measurements, current measurement gaps do not provide enough room to accommodate both PRS measurements and other legacy NR data scheduling, such as one or more other NR radio resource management (RRM) measurements. In addition, enhanced mechanisms are needed to determine reference signal time difference RSTD measurement delays for PRS measurements in NR networks.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
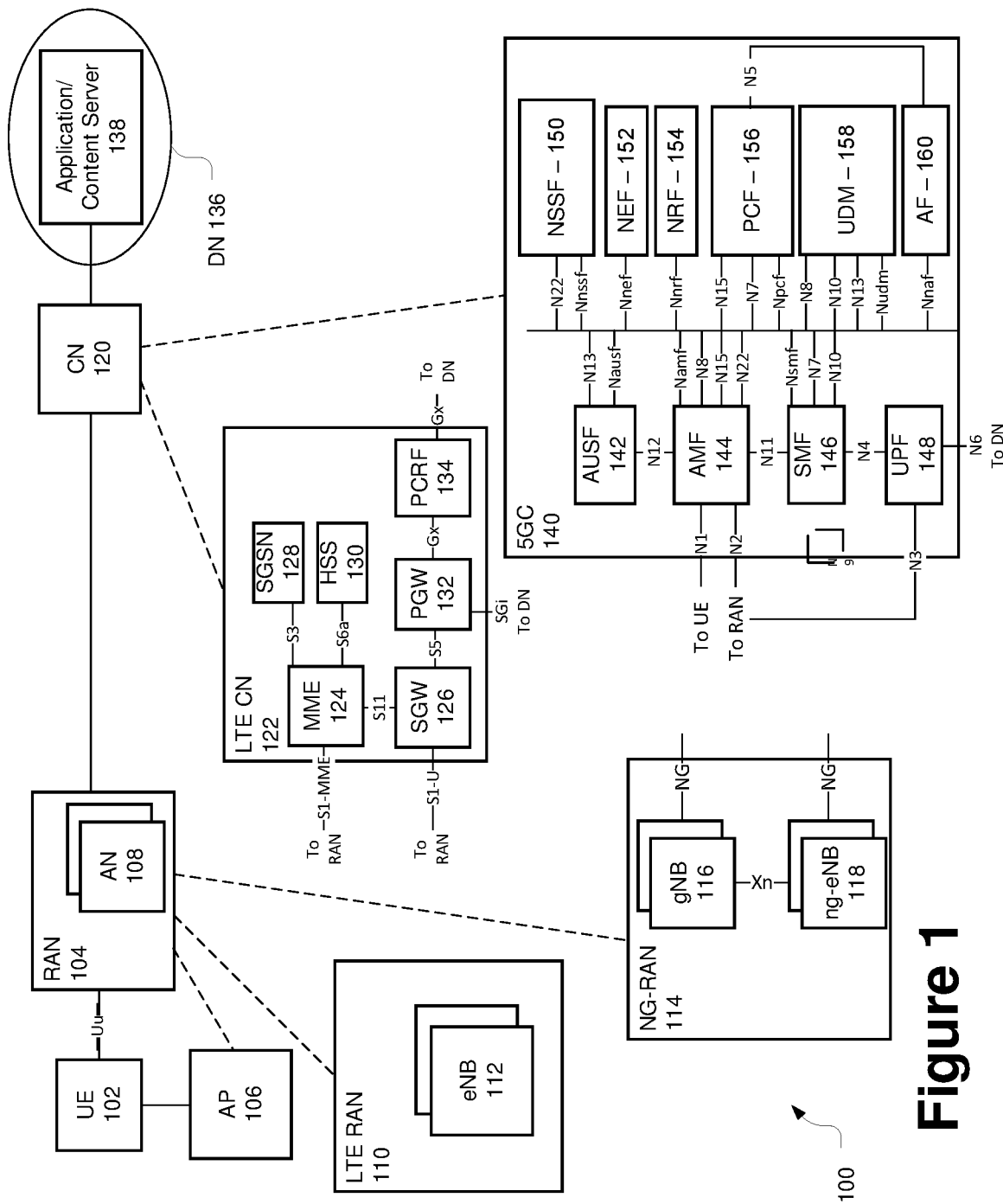
FIG. 1 shows a communication network according to some embodiments.
Figure 2:
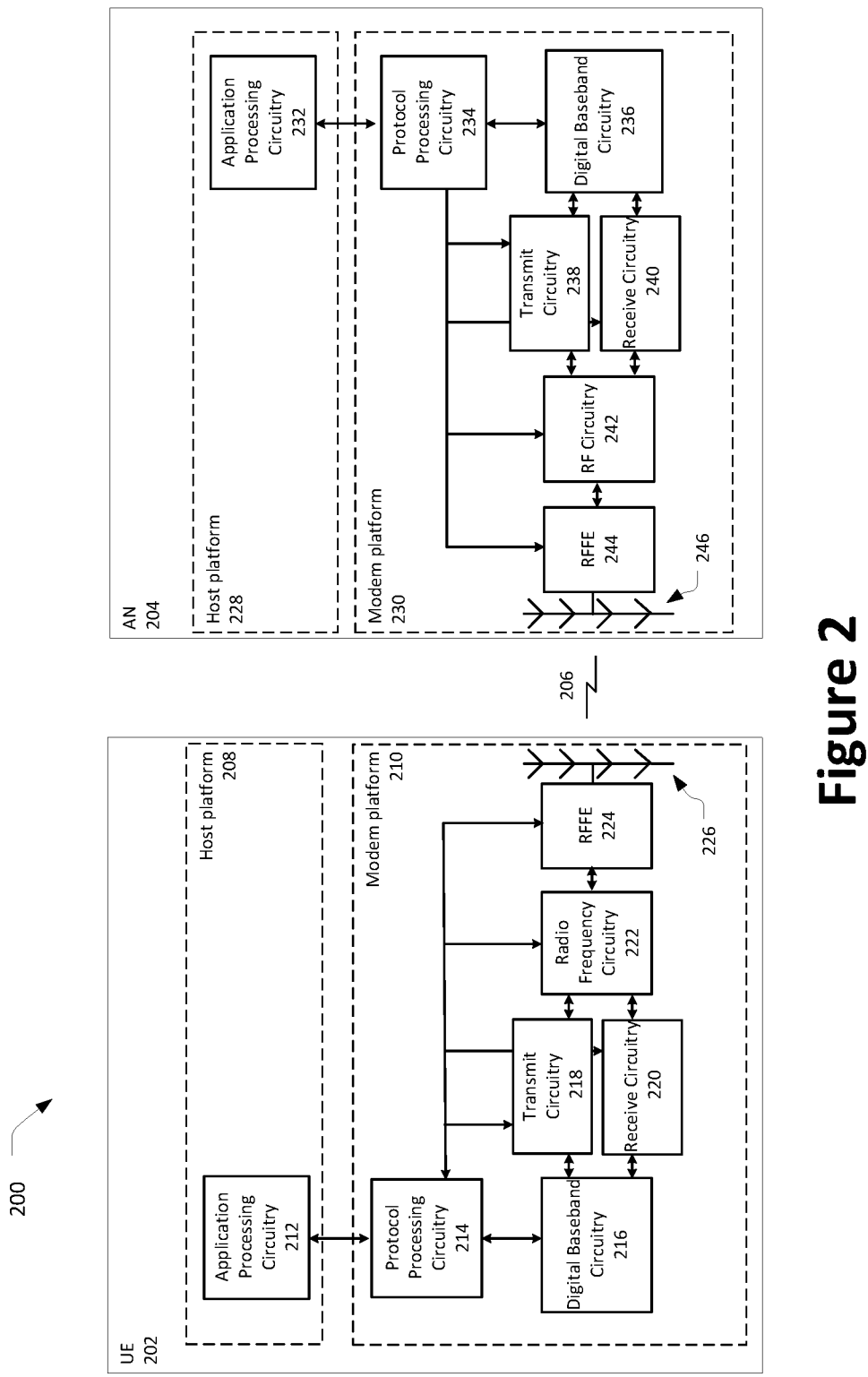
FIG. 2 shows a cellular wireless network between a UE and an access node (AN) according to some embodiments.
Figure 3:
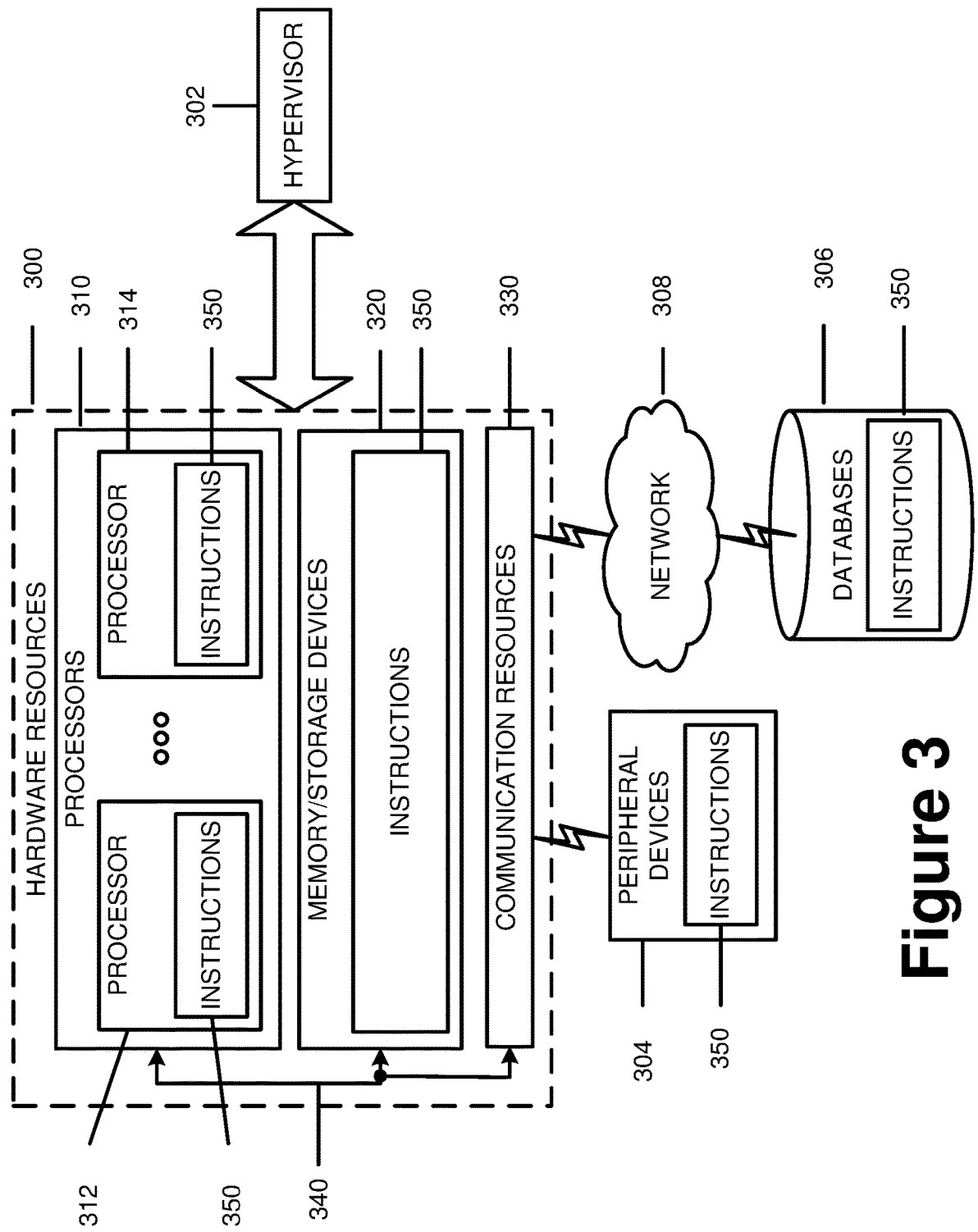
FIG. 3 shows components, according to some example embodiments, able to read instructions from a machine-readable or computer-readable medium.

In some embodiments, the electronic device(s), network (s), system(s), chip(s) or component(s), or portions or implementations thereof, of FIGS. 1-3, or some other figure herein, may be configured to perform one or more processes, techniques, or methods as described herein, or portions thereof. One such process is depicted in FIGS. 1-3. In some embodiments, the process may be performed by a UE or a portion thereof.

FIG. 1 illustrates a communication network 100 in accordance with various embodiments, the network including a 5G system architecture. The network 100 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 100 may include a user equipment (UE) 102, which may include any mobile or non-mobile computing device designed to communicate with a RAN 104 via an over-the-air connection. The UE 102 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 100 may include a plurality of UEs coupled directly with one another via a sidelink interface. The UEs may be machine-to-machine or device-to-device (M2M/D2D) devices that communicate using physical sidelink channels such as, but not limited to, physical sidelink broadcast channel (PSBCH), physical sidelink discovery channel (PSDCH), physical sidelink shared channel (PSSCH), physical sidelink control channel (PSCCH), physical sidelink feedback channel (PSFCH), etc.

In some embodiments, the UE 102 may additionally communicate with an access point (AP) 106 via an over-the-air connection. The AP 106 may manage a WLAN connection, which may serve to offload some/all network traffic from the RAN 104. The connection between the UE 102 and the AP 106 may be consistent with any IEEE 802.11 protocol, wherein the AP 106 could be a wireless fidelity (Wi-Fi®) router. In some embodiments, the UE 102, RAN 104, and AP 106 may utilize cellular-WLAN aggregation (for example, LWA/LWIP). Cellular-WLAN aggregation may involve the UE 102 being configured by the RAN 104 to utilize both cellular radio resources and WLAN resources.

The RAN 104 may include one or more access nodes, for example, AN 108. AN 108 may terminate air-interface protocols for the UE 102 by providing access stratum protocols including radio resource control (RRC), packet data convergence protocol (PDCP), radio link control (RLC), medium access control (MAC), and layer 1 (L1) protocols. In this manner, the AN 108 may enable data/voice connectivity between CN 120 and the UE 102. In some embodiments, the AN 108 may be implemented in a discrete device or as one or more software entities running on server computers as part of, for example, a virtual network, which may be referred to as a CRAN or virtual baseband unit pool. The AN 108 be referred to as a BS, gNB, RAN node, eNB, ng-eNB, NodeB, RSU, TRxP, TRP, etc. The AN 108 may be a macrocell base station or a low power base station for providing femtocells, picocells or other like cells having smaller coverage areas, smaller user capacity, or higher bandwidth compared to macrocells.

In embodiments in which the RAN 104 includes a plurality of ANs, they may be coupled with one another via an X2 interface (if the RAN 104 is an LTE RAN) or an Xn interface (if the RAN 104 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 104 may each manage one or more cells, cell groups, component carriers, etc. to provide the UE 102 with an air interface for network access. The UE 102 may be simultaneously connected with a plurality of cells provided by the same or different ANs of the RAN 104. For example, the UE 102 and RAN 104 may use carrier aggregation to allow the UE 102 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 104 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 102 or AN 108 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 104 may be an LTE RAN 110 with eNBs, for example, eNB 112. The LTE RAN 110 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 104 may be an NG-RAN 114 with gNBs, for example, gNB 116, or ng-eNBs, for example, ng-eNB 118. The gNB 116 may connect with 5G-enabled UEs using a 5G NR interface. The gNB 116 may connect with a 5G core through an NG interface, which may include an N2 interface or an N3 interface. The ng-eNB 118 may also connect with the 5G core through an NG interface, but may connect with a UE via an LTE air interface. The gNB 116 and the ng-eNB 118 may connect with each other over an Xn interface.

In some embodiments, the NG interface may be split into two parts, an NG user plane (NG-U) interface, which carries traffic data between the nodes of the NG-RAN 114 and a UPF 148 (e.g., N3 interface), and an NG control plane (NG-C) interface, which is a signaling interface between the nodes of the NG-RAN 114 and an AMF 144 (e.g., N2 interface).

The NG-RAN 114 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 102 can be configured with multiple BWPs where each BWP configuration has a different SCS. When a BWP change is indicated to the UE 102, the SCS of the transmission is changed as well. Another use case example of BWP is related to power saving. In particular, multiple BWPs can be configured for the UE 102 with different amount of frequency resources (for example, PRBs) to support data transmission under different traffic loading scenarios. A BWP containing a smaller number of PRBs can be used for data transmission with small traffic load while allowing power saving at the UE 102 and in some cases at the gNB 116. A BWP containing a larger number of PRBs can be used for scenarios with higher traffic load.

The RAN 104 is communicatively coupled to CN 120 that includes network elements to provide various functions to support data and telecommunications services to customers/subscribers (for example, users of UE 102). The components of the CN 120 may be implemented in one physical node or separate physical nodes. In some embodiments, NFV may be utilized to virtualize any or all of the functions provided by the network elements of the CN 120 onto physical compute/storage resources in servers, switches, etc. A logical instantiation of the CN 120 may be referred to as a network slice, and a logical instantiation of a portion of the CN 120 may be referred to as a network sub-slice.

In some embodiments, the CN 120 may be an LTE CN 122, which may also be referred to as an EPC. The LTE CN 122 may include MME 124, SGW 126, SGSN 128, HSS 130, PGW 132, and PCRF 134 coupled with one another over interfaces (or "reference points") as shown. Functions of the elements of the LTE CN 122 may be briefly introduced as follows.

The MME 124 may implement mobility management functions to track a current location of the UE 102 to facilitate paging, bearer activation/deactivation, handovers, gateway selection, authentication, etc.

The SGW 126 may terminate an S1 interface toward the RAN and route data packets between the RAN and the LTE CN 122. The SGW 126 may be a local mobility anchor point for inter-RAN node handovers and also may provide an anchor for inter-3GPP mobility. Other responsibilities may include lawful intercept, charging, and some policy enforcement.

The SGSN 128 may track a location of the UE 102 and perform security functions and access control. In addition, the SGSN 128 may perform inter-EPC node signaling for mobility between different RAT networks; PDN and S-GW selection as specified by MME 124; MME selection for handovers; etc. The S3 reference point between the MME 124 and the SGSN 128 may enable user and bearer information exchange for inter-3GPP access network mobility in idle/active states.

The HSS 130 may include a database for network users, including subscription-related information to support the network entities' handling of communication sessions. The HSS 130 can provide support for routing/roaming, authentication, authorization, naming/addressing resolution, location dependencies, etc. An S6a reference point between the HSS 130 and the MME 124 may enable transfer of subscription and authentication data for authenticating/authorizing user access to the LTE CN 120.

The PGW 132 may terminate an SGi interface toward a data network (DN) 136 that may include an application/content server 138. The PGW 132 may route data packets between the LTE CN 122 and the data network 136. The PGW 132 may be coupled with the SGW 126 by an S5 reference point to facilitate user plane tunneling and tunnel management. The PGW 132 may further include a node for policy enforcement and charging data collection (for example, PCEF). Additionally, the SGi reference point between the PGW 132 and the data network 136 may be an operator external public, a private PDN, or an intra-operator packet data network, for example, for provision of IMS services. The PGW 132 may be coupled with a PCRF 134 via a Gx reference point.

The PCRF 134 is the policy and charging control element of the LTE CN 122. The PCRF 134 may be communicatively coupled to the app/content server 138 to determine appropriate QoS and charging parameters for service flows. The PCRF 132 may provision associated rules into a PCEF (via Gx reference point) with appropriate TFT and QCI.

In some embodiments, the CN 120 may be a 5GC 140. The 5GC 140 may include an AUSF 142, AMF 144, SMF 146, UPF 148, NSSF 150, NEF 152, NRF 154, PCF 156, UDM 158, and AF 160 coupled with one another over interfaces (or "reference points") as shown. Functions of the elements of the 5GC 140 may be briefly introduced as follows.

The AUSF 142 may store data for authentication of UE 102 and handle authentication-related functionality. The AUSF 142 may facilitate a common authentication framework for various access types. In addition to communicating with other elements of the 5GC 140 over reference points as shown, the AUSF 142 may exhibit an Nausf service-based interface.

The AMF 144 may allow other functions of the 5GC 140 to communicate with the UE 102 and the RAN 104 and to subscribe to notifications about mobility events with respect to the UE 102. The AMF 144 may be responsible for registration management (for example, for registering UE 102), connection management, reachability management, mobility management, lawful interception of AMF-related events, and access authentication and authorization. The AMF 144 may provide transport for SM messages between the UE 102 and the SMF 146, and act as a transparent proxy for routing SM messages. AMF 144 may also provide transport for SMS messages between UE 102 and an SMSF. AMF 144 may interact with the AUSF 142 and the UE 102 to perform various security anchor and context management functions. Furthermore, AMF 144 may be a termination point of a RAN CP interface, which may include or be an N2 reference point between the RAN 104 and the AMF 144; and the AMF 144 may be a termination point of NAS (N1) signaling, and perform NAS ciphering and integrity protection. AMF 144 may also support NAS signaling with the UE 102 over an N3 IWF interface.

The SMF 146 may be responsible for SM (for example, session establishment, tunnel management between UPF 148 and AN 108); UE IP address allocation and management (including optional authorization); selection and control of UP function; configuring traffic steering at UPF 148 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 144 over N2 to AN 108; and determining SSC mode of a session. SM may refer to management of a PDU session, and a PDU session or "session" may refer to a PDU connectivity service that provides or enables the exchange of PDUs between the UE 102 and the data network 136.

The UPF 148 may act as an anchor point for intra-RAT and inter-RAT mobility, an external PDU session point of interconnect to data network 136, and a branching point to support multi-homed PDU session. The UPF 148 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 148 may include an uplink classifier to support routing traffic flows to a data network.

The NSSF 150 may select a set of network slice instances serving the UE 102. The NSSF 150 may also determine allowed NSSAI and the mapping to the subscribed S-NS-SAIs, if needed. The NSSF 150 may also determine the AMF set to be used to serve the UE 102, or a list of candidate AMFs based on a suitable configuration and possibly by querying the NRF 154. The selection of a set of network slice instances for the UE 102 may be triggered by the AMF 144 with which the UE 102 is registered by interacting with the NSSF 150, which may lead to a change of AMF. The NSSF 150 may interact with the AMF 144 via an N22 reference point; and may communicate with another NSSF in a visited network via an N31 reference point (not shown). Additionally, the NSSF 150 may exhibit an Nnssf service-based interface.

The NEF 152 may securely expose services and capabilities provided by 3GPP network functions for third party, internal exposure/re-exposure, AFs (e.g., AF 160), edge computing or fog computing systems, etc. In such embodiments, the NEF 152 may authenticate, authorize, or throttle the AFs. NEF 152 may also translate information exchanged with the AF 160 and information exchanged with internal network functions. For example, the NEF 152 may translate between an AF-Service-Identifier and an internal 5GC information. NEF 152 may also receive information from other NFs based on exposed capabilities of other NFs. This information may be stored at the NEF 152 as structured data, or at a data storage NF using standardized interfaces. The stored information can then be re-exposed by the NEF 152 to other NFs and AFs, or used for other purposes such as analytics. Additionally, the NEF 152 may exhibit an Nnef service-based interface.

The NRF 154 may support service discovery functions, receive NF discovery requests from NF instances, and provide the information of the discovered NF instances to the NF instances. NRF 154 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 154 may exhibit the Nnrf service-based interface.

The PCF 156 may provide policy rules to control plane functions to enforce them, and may also support unified policy framework to govern network behavior. The PCF 156 may also implement a front end to access subscription information relevant for policy decisions in a UDR of the UDM 158. In addition to communicating with functions over reference points as shown, the PCF 156 exhibit an Npcf service-based interface.

The UDM 158 may handle subscription-related information to support the network entities' handling of communication sessions, and may store subscription data of UE 102. For example, subscription data may be communicated via an N8 reference point between the UDM 158 and the AMF 144. The UDM 158 may include two parts, an application front end and a UDR. The UDR may store subscription data and policy data for the UDM 158 and the PCF 156, and/or structured data for exposure and application data (including PFDs for application detection, application request information for multiple UEs 102) for the NEF 152. The Nudr service-based interface may be exhibited by the UDR 221 to allow the UDM 158, PCF 156, and NEF 152 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 158 may exhibit the Nudm service-based interface.

The AF 160 may provide application influence on traffic routing, provide access to NEF, and interact with the policy framework for policy control.

In some embodiments, the 5GC 140 may enable edge computing by selecting operator/3rd party services to be geographically close to a point that the UE 102 is attached to the network. This may reduce latency and load on the network. To provide edge-computing implementations, the 5GC 140 may select a UPF 148 close to the UE 102 and execute traffic steering from the UPF 148 to data network 136 via the N6 interface. This may be based on the UE subscription data, UE location, and information provided by the AF 160. In this way, the AF 160 may influence UPF (re)selection and traffic routing. Based on operator deployment, when AF 160 is considered to be a trusted entity, the network operator may permit AF 160 to interact directly with relevant NFs. Additionally, the AF 160 may exhibit an Naf service-based interface.

The data network 136 may represent various network operator services, Internet access, or third party services that may be provided by one or more servers including, for example, application/content server 138.

A gNB, such as gNB 116, may be disaggregated, and include a gNB-Central Unit (gNB-CU) and one or more gNB Distributed Unit(s) (gNB-DU(s)). A gNB-CU and a gNB-DU are connected via F1 interface. NG, Xn and F1 are logical interfaces. For NG-RAN, the NG and Xn-Control (Xn-C) interfaces for a gNB including a gNB-CU and gNB-DUs terminate in the gNB-CU. For EN-DC, the S1-U (S1-User plane) and X2-C(X2-Control plane) interfaces for a gNB including a gNB-CU and gNB-DUs terminate in the gNB-CU. The gNB-CU and connected gNB-DUs are only visible as a gNB to other gNBs and to the 5GC.

To address the issue of explosive increases of the bandwidth required for the transport between the gNB-CU and gNB-DU by the introduction of massive multiple-input multiple output (MIMO) and extending the frequency bandwidth using Cloud RAN (C-RAN) deployment, the functional split between gNB-CU and gNB-DU within gNB and the corresponding open interface between these nodes has been defined. Specifically, a functional split has been adopted where the PDCP layer and above can be located in the gNB-CU, and the RLC layer and below can be located in the gNB-DU. The standard interface between them is specified as F1.

3GPP standardization has defined an open interface between the control-plane (C-plane) termination parts and user-plane (U-plane) termination parts of gNB-CU so that the functional separation between the two can be achieved even between different vendors. A node that terminates the C-plane of gNB-CU is called gNB-CU-CP, and a node that terminates the U-plane of the gNB-CU is called gNB-CU-UP. The standard interface between these nodes is specified as E1.

F1-C refers to the standard interface between the gNB-DU and a control plane of the gNB-CU, and F1-U refers to the standard interface between the gNB-DU and a user plane of the gNB-CU.

A gNB-CU refers to a logical node hosting radio resource control (RRC), Service Data Adaptation Protocol (SDAP) and PDCP protocols of the gNB or RRC, and PDCP protocols of the en-gNB, and controls the operation of one or more gNB-DUs.

A gNB-DU refers to a logical node hosting RLC, medium access control (MAC) and physical (PHY) layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU. A gNB-CU-Control Plane (gNB-CU-CP) is a logical node hosting the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU. A gNB-CU-User Plane (gNB-CU-UP) is a logical node hosting the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

FIG. 2 schematically illustrates a cellular wireless network 200 in accordance with various embodiments. The wireless network 200 may include a UE 202 in wireless communication with an AN 204. The UE 202 and AN 204 may be similar to, and substantially interchangeable with, like-named components described elsewhere herein.

The UE 202 may be communicatively coupled with the AN 204 via connection 206. The connection 206 is illustrated as an air interface to enable communicative coupling, and can be consistent with cellular communications protocols such as an LTE protocol or a 5G NR protocol operating at mmWave or sub-6 GHz frequencies.

The UE 202 may include a host platform 208 coupled with a modem platform 210. The host platform 208 may include application processing circuitry 212, which may be coupled with protocol processing circuitry 214 of the modem platform 210. The application processing circuitry 212 may run various applications for the UE 202 that source/sink application data. The application processing circuitry 212 may further implement one or more layer operations to transmit/receive application data to/from a data network. These layer operations may include transport (for example UDP) and Internet (for example, IP) operations The protocol processing circuitry 214 may implement one or more of layer operations to facilitate transmission or reception of data over the connection 206. The layer operations implemented by the protocol processing circuitry 214 may include, for example, MAC, RLC, PDCP, RRC and NAS operations.

The modem platform 210 may further include digital baseband circuitry 216 that may implement one or more layer operations that are "below" layer operations performed by the protocol processing circuitry 214 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 210 may further include transmit circuitry 218, receive circuitry 220, RF circuitry 222, and RF front end (RFFE) 224, which may include or connect to one or more antenna panels 226. Briefly, the transmit circuitry 218 may include a digital-to-analog converter, mixer, intermediate frequency (IF) components, etc.; the receive circuitry 220 may include an analog-to-digital converter, mixer, IF components, etc.; the RF circuitry 222 may include a low-noise amplifier, a power amplifier, power tracking components, etc.; RFFE 224 may include filters (for example, surface/bulk acoustic wave filters), switches, antenna tuners, beamforming components (for example, phase-array antenna components), etc. The selection and arrangement of the components of the transmit circuitry 218, receive circuitry 220, RF circuitry 222, RFFE 224, and antenna panels 226 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 214 may include one or more instances of control circuitry (not shown) to provide control functions for the transmit/receive components.

A UE reception may be established by and via the antenna panels 226, RFFE 224, RF circuitry 222, receive circuitry 220, digital baseband circuitry 216, and protocol processing circuitry 214. In some embodiments, the antenna panels 226 may receive a transmission from the AN 204 by receive-beamforming signals received by a plurality of antennas/antenna elements of the one or more antenna panels 226.

A UE transmission may be established by and via the protocol processing circuitry 214, digital baseband circuitry 216, transmit circuitry 218, RF circuitry 222, RFFE 224, and antenna panels 226. In some embodiments, the transmit components of the UE 204 may apply a spatial filter to the data to be transmitted to form a transmit beam emitted by the antenna elements of the antenna panels 226.

Similar to the UE 202, the AN 204 may include a host platform 228 coupled with a modem platform 230. The host platform 228 may include application processing circuitry 232 coupled with protocol processing circuitry 234 of the modem platform 230. The modem platform may further include digital baseband circuitry 236, transmit circuitry 238, receive circuitry 240, RF circuitry 242, RFFE circuitry 244, and antenna panels 246. The components of the AN 204 may be similar to and substantially interchangeable with like-named components of the UE 202. In addition to performing data transmission/reception as described above, the components of the AN 208 may perform various logical functions that include, for example, RNC functions such as radio bearer management, uplink and downlink dynamic radio resource management, and data packet scheduling.

FIG. 3 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 3 shows a diagrammatic representation of hardware resources 300 including one or more processors (or processor cores) 310, one or more memory/storage devices 320, and one or more communication resources 330, each of which may be communicatively coupled via a bus 340 or other interface circuitry. For embodiments where node virtualization (e.g., NFV) is utilized, a hypervisor 302 may be executed to provide an execution environment for one or more network slices/subslices to utilize the hardware resources 300.

The processors 310 may include, for example, a processor 312 and a processor 314. The processors 310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 320 may include main memory, disk storage, or any suitable combination thereof. The memory/storage devices 320 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 330 may include interconnection or network interface controllers, components, or other suitable devices to communicate with one or more peripheral devices 304 or one or more databases 306 or other network elements via a network 308. For example, the communication resources 330 may include wired communication components (e.g., for coupling via USB, Ethernet, etc.), cellular communication components, NFC components, Bluetooth® (or Bluetooth® Low Energy) components, Wi-Fi® components, and other communication components.

Instructions 350 may comprise software, a program, an application, an applet, an app, or other executable code for causing at least any of the processors 310 to perform any one or more of the methodologies discussed herein. The instructions 350 may reside, completely or partially, within at least one of the processors 310 (e.g., within the processor's cache memory), the memory/storage devices 320, or any suitable combination thereof. Furthermore, any portion of the instructions 350 may be transferred to the hardware resources 300 from any combination of the peripheral devices 304 or the databases 306. Accordingly, the memory of processors 310, the memory/storage devices 320, the peripheral devices 304, and the databases 306 are examples of computer-readable and machine-readable media.

Any of the features of FIGS. 1-3 may be used by way of example to implement a UE measurement delay and UE measurement granularity for NR positioning measurement according to some embodiments.

UE Measurement Delay for New Radio Positioning Measurement:

Cellular technology based UE positioning provides a multilateration technique according to which the serving base station estimates the UE's location, based on UE reported downlink reference signal (DL RS) measurements (e.g. timing, angle, cell ID, etc.), or based on direct measurement of UE transmitted uplink reference signals (UL RS), which UL RS are received by the base stations. For a Third Generation Partnership Project (3GPP) design, Fourth Generation Long Term Evolution (4G LTE) based positioning technology has been developed since Release 9, while Fifth Generation (5G) New Radio (NR) based positioning technology is currently under development for Release 16. In particular, a NR positioning radio signal (PRS) pattern has been defined by radio access network 1 (RAN1) in Release 16, which is used for UE to apply downlink (DL) reference signal time difference (RSTD) measurement and reporting. For NR PRS based RSTD measurement, when the bandwidth (BW) of a NR PRS is not allocated within the BW of the serving cell active DL BWP, a DL interruption is required for UE to switch the receive (RX) carrier frequency and the RF BW, to receive and measure the NR PRS. Similarly to synchronization signal block (SSB) based radio resource management (RRM) measurements in NR (e.g. synchronization signal-reference signal receive power (SS-RSRP)), a measurement gap can be introduced for RSTD measurement. In order to reduce UE implementation complexity, the current RAN4 assumption is to reuse the measurement gap pattern from SSB based RRM measurement for inter-frequency RSTD measurement.

On the one hand, according to RAN1 status, the maximum number of symbols per DL PRS Resource and number of resources per DL PRS Resource Set are defined. Based on latest RAN1 working group (WG) agreements, it is possible to have a duration of PRS resource with a maximal length of 12/14*32=27 slots. In other words, the denser PRS resource within a PRS periodicity is necessary in case of the higher PRS repetition desired.

According to Agreement R1 #97:

Number of symbols for DL PRS Resource is configurable from the following set {2, 4, 6}

FFS: Inclusion of other values in the set including values in {1, 3, 8, 12}

DL PRS Resource comb-N value is configurable from the set {2, 4, 6}

For further study (FFS): Inclusion of other values in the set including values in {1, 8, 12}

Note: The dependence between the number of symbols and the combination size should be considered when considering the inclusion of additional values in the sets for these parameters DL-PRS-ResourceBandwidth=(24, 28, 32, 36, 40, . . . , 268, 272)PRBs According to Agreement: R1 #98b:

Parameter DL-PRS-ResourceRepetitionFactor is configured for a DL PRS Resource Set and controls how many times each DL-PRS Resource is repeated for a single instance of the DL-PRS Resource Set.

Values: 1, 2, 4, 6, 8, 16, 32

On the other hand, for the existing inter-frequency gap pattern, which is used for SSB based inter-frequency measurement, a maximum measurement gap length (MGL) is only up to 6 ms. As a result, a UE may make very limited number of PRS resource repetitions which are captured within an single inter-frequency measurement gap. For example depending on PRS resource configuration and gap pattern configuration, the number of PRS resource within a gap can be even less than 1. Some examples are shown in Table 1 below.

TABLE 1

| New gap pattern ID | MG length (ms) | MG period (ms) |
|---|---|---|
| 0 | 10 | 80 |
| 1 | 10 | 160 |
| 2 | 20 | 80 |
| 3 | 20 | 160 |
| 4 | 40 | 160 |
| 5 | 40 | 320 |
| 6 | 40 | 640 |
| 7 | 50 | 160 |
| 8 | 50 | 320 |
| 9 | 50 | 640 |

If these new gap patterns are shared with other NR data scheduling, such as one or more other NR RRM measurements (e.g. SSB RSRP, CSI-RS RSRP, etc.), there will be huge impacts on the current system procedure and performance.

First, the instant disclosure proposes to introduce new measurement gap patterns to support gap based inter-frequency RSTD measurement for 5G NR, such that a MGL length can be higher than 6 ms.

Second, in order to capture as many inter-frequency PRS repetitions as possible within the RSTD measurement gap pattern, the instant disclosure proposes that, the configured RSTD measurement gap pattern by the serving NR NodeB (gNB) to the UE, could be adapted based on the inter-frequency PRS pattern, which is configured from the NR-PP (new radio positioning protocol) server. Since gNB may not have the information of PRS pattern of neighboring gNBs, a new UE message could be introduced such the inter-frequency PRS pattern information could be indicated from the UE back to the serving gNB.

Third, the disclosure further proposes that, new UE capability could be introduced, which indicates whether it requires extended measurement gap pattern with extended MGL, so as to support massive PRS repetitions within a gap, or that it could still measure the inter-frequency RSTD with cut-off PRS repetitions within a gap. The actual measurement gap allocation from the serving gNB could be adapted accordingly.

Optimizing the Trade-Off Between UE Complexity and Gap Based Inter-Frequency RSTD Measurement Accuracy for 5G NR.

For gap based inter-frequency RSTD measurement for 5G NR, the current assumption is to reuse the SSB based inter-frequency measurement gap pattern for NR PRS. However, practically, in case of lower PRS periodicity with a small bandwidth, a PRS shall be repeated many times to ensure the RSTD measurement accuracy. For example, if PRS bandwidth (BW)=24 physical resource blocks (PRBs) minimum, in order to meet the RSTD accuracy requirement, with a signal to noise and interference ratio (SINR) side condition of −13 dB, the required minimum PRS repetition number is 16. In this case, a duration of the PRS resource (with 16 repetitions) can be longer than 6 ms, such that it could not be completely captured by a measurement gap. To address this issue, this disclosure proposes measurement gap enhancements for NR PRS based RSTD measurement.

First, this disclosure proposes to introduce new measurement gap patterns to support gap based inter-frequency RSTD measurement for 5G NR, such that a MGL length can be higher than 6 ms. Table 2 shows some examples of such extension, for the measurement gap configuration table, which is defined in 3GPP Technical Specification (TS) 38.133.

TABLE 2

| New gap pattern ID | MG length (ms) | MG period (ms) |
|---|---|---|
| 0 | 10 | 80 |
| 1 | 10 | 160 |
| 2 | 20 | 80 |
| 3 | 20 | 160 |
| 4 | 40 | 160 |
| 5 | 40 | 320 |
| 6 | 40 | 640 |
| 7 | 50 | 160 |
| 8 | 50 | 320 |
| 9 | 50 | 640 |

As a further extension of the second method, based on the PRS pattern information from the NR-PP (new radio positioning protocol) server, UE could determine a preferred inter-frequency RSTD measurement gap pattern and then directly indicate the preferred pattern index to the serving gNB.

Figure 4:
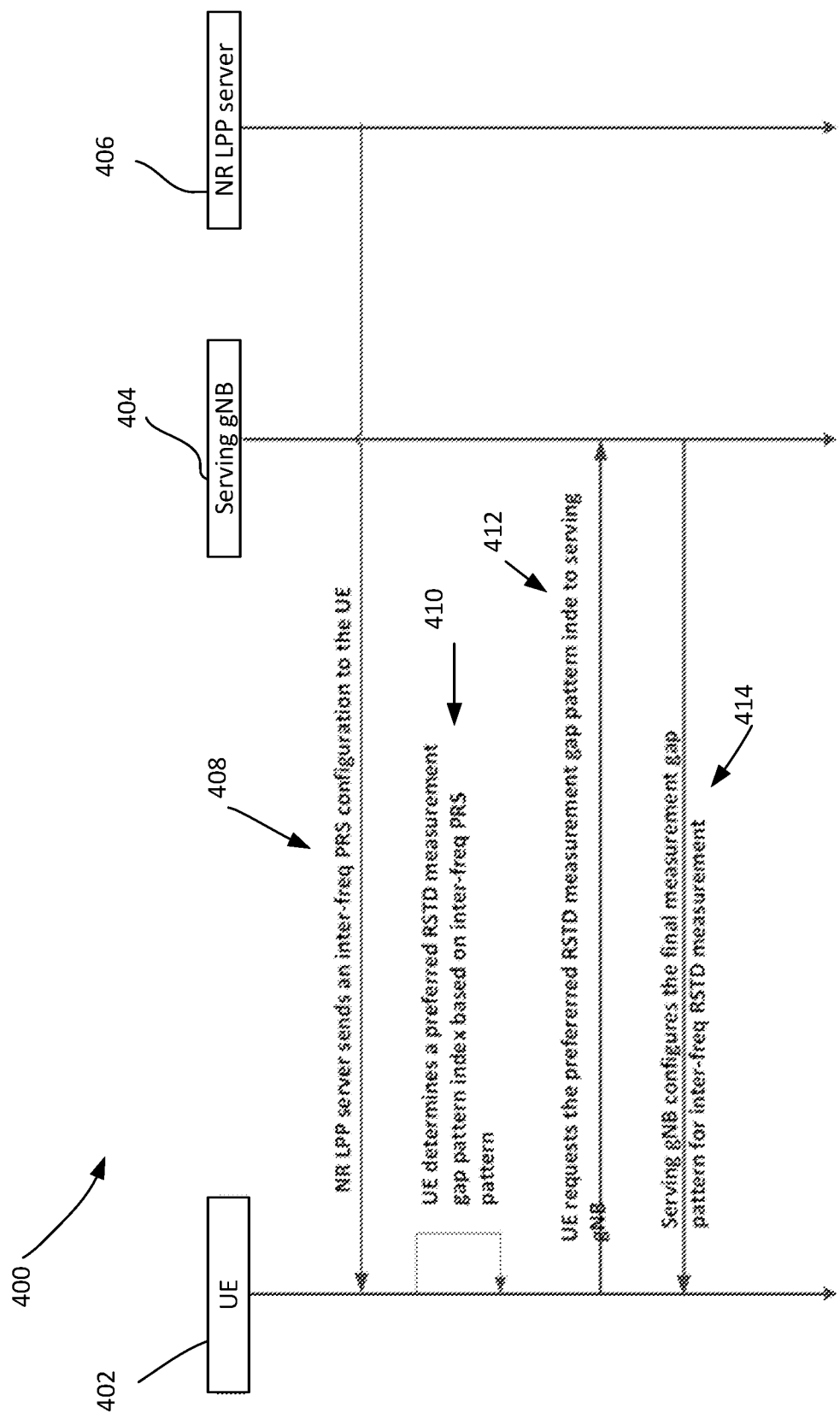
FIG. 4 is a flow chart of an example procedure of adaptive inter-frequency RSTD measurement gap pattern configuration according to one embodiment.

FIG. 4 shows an example flow chart 400 for arriving at the proposed extension as noted above.

As shown in FIG. 4, a UE 402, a serving gNB 404 and a NR Long Term Evolution positioning protocol (LPP) server 406 may communicate within a NR network. At operation 408, the NR LPP server 406 may send an inter-frequency PRS configuration message to the UE 402. The UE may decode the inter-frequency PRS configuration message to determine a inter-frequency PRS pattern therefrom, and thereafter, at operation 410, the UE may determine a preferred RSTD measurement gap pattern index based on the on the inter-frequency PRS pattern. At 412, the UE may send a request to the serving gNB 404 to request the preferred RSTD measurement gap pattern from gNB 404. The gNB may decode the request from the UE, and may, at 414, based on the request, send a message to the UE to configure the UE with a final measurement gap pattern for inter-frequency RSTD measurement.

Embodiment 1

The instant disclosure further proposes that, if these new gap pattern will be used for the positioning measurement only, the serving gNB can grant the new gap patterns for PRS measurement to the UE. Otherwise, when there is ongoing NR data scheduling, such as ongoing RRM measurements (e.g. SSB RSRP, CSI-RSRP), the legacy gap pattern in NR Release 15 will be configured to UE for both PRS measurement and SSB measurement.

Figure 5:
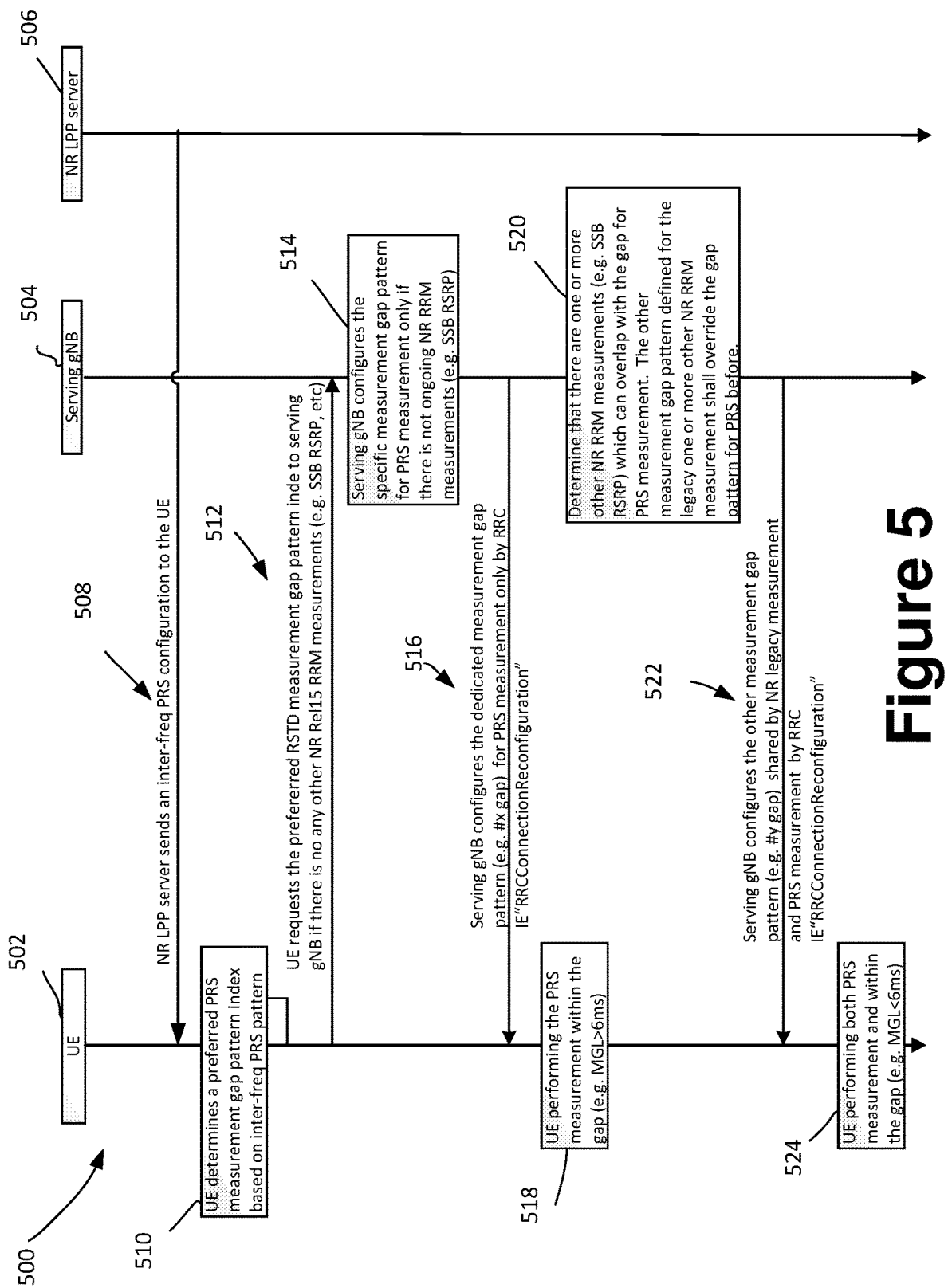
FIG. 5 is a flow chart of an example procedure of inter-frequency RSTD measurement gap allocation by UE capability indication according to a first embodiment.

As shown in FIG. 5, a UE 502, a serving gNB 504 and a NR LPP server 506 may communicate within a NR network. At operation 508, the NR LPP server 506 may send an inter-frequency PRS configuration message to the UE 502. The UE may decode the inter-frequency PRS configuration message to determine a inter-frequency PRS pattern therefrom, and thereafter, at operation 510, the UE may determine a preferred RSTD measurement gap pattern index based on the on the inter-frequency PRS pattern. At 512, the UE may send a request to the serving gNB 504 to request the preferred RSTD measurement gap pattern from gNB 504 if there is no other NR RRM measurements, such as legacy NR RRM measurements (e.g. Release 15 RRM measurements such as SSB RSRP, etc.). The gNB 504 may decode the request from the UE, and may, at 514, based on the request, configure the specific (preferred) RSTD measurement gap pattern for PRS measurement only if there is no ongoing other NR RRM measurements. At operation 516, the serving gNB 504 may send a message to the UE to configure the UE with the dedicated, preferred RSTD measurement gap pattern for PRS measurement, wherein the message corresponds to a radio resource control (RRC) information element (IE) RRCConnectionReconfiguration. At operation 518, the UE may perform the PRS measurement within a gap corresponding with the preferred RSTD measurement gap pattern (e.g. measurement gap length (MGL) of >6 ms). At operation 520, in response to a determination that one or more other NR data scheduling events, such as one or more other NR data scheduling measurements, such as one or more other NR RRM measurements (e.g. SSB RSRP), which can overlap with the gap configured for PRS measurement, are to take place, the gNB determines to override the preferred RSTD measurement gap pattern with a measurement gap pattern for the one or more other NR data scheduling events. At operation 522, the gNB 504 may send a RRC message to the UE 502 to configure the UE with the measurement gap pattern shared between the one or more other NR data scheduling events and PRS measurement using a RRC IE RRCConnectionConfiguration. At operation 524, the UE may perform both the PRS measurement and the one or more other NR data scheduling events within the shared measurement gap pattern.

Embodiment 2

Other method proposed in this disclosure is that, if the new gap patterns used only by the PRS measurement is introduced, the serving gNB can exchange the configured measurement SSB based measurement timing configuration (SMTC) with the location management function (LMF) which configures the PRS measurement periodicity and occasion. Thus, the coordination between the serving gNB and LMF can be helpful to avoid the collision between PRS measurement gap and SSB based measurement gap. The flow of FIG. 6 depicts an exemplary implementation of the above.

Figure 6:
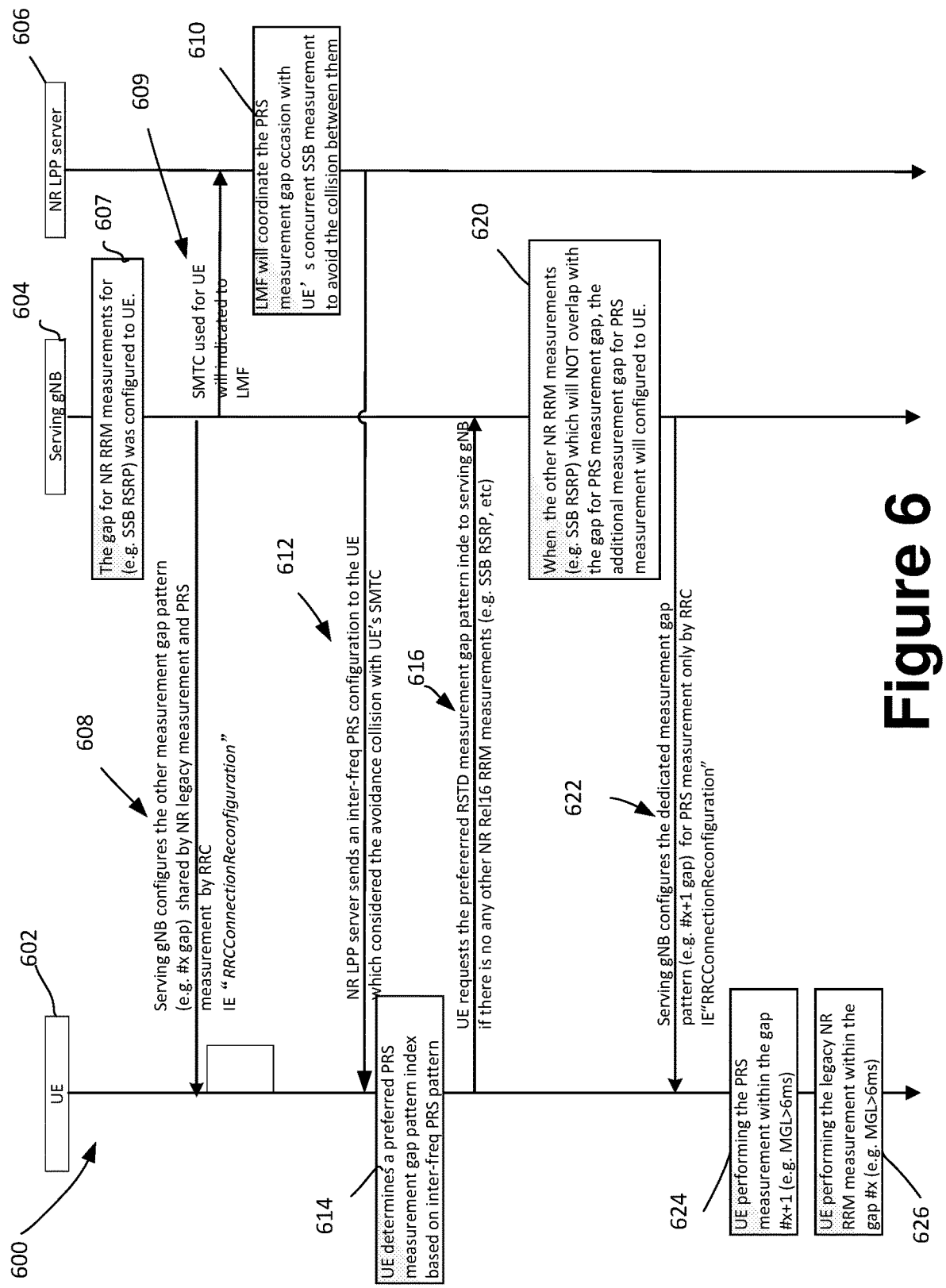
FIG. 6 is a flow chart of an example procedure of inter-frequency RSTD measurement gap allocation by UE capability indication according to a second embodiment.

As shown in FIG. 6, a UE 602, a serving gNB 604 and a NR LPP server 606 may communicate within a NR network. At operation 607, the gNB may determine that the measurement gap for one or more other NR data scheduling events such as SSB RSRP was configured to UE 602. At operation 608, the gNB 604 may send a RRC message to the UE 602 to configure the UE with a measurement gap pattern shared between the one or more other NR data scheduling events and PRS measurement (shared measurement gap pattern). The UE may decode the RRC message to determine the shared measurement gap pattern therefrom. At operation 609, the gNB 604 sends a SMTC used for the UE to indicate the SMTC to the LMF of the NR LPP server 606. At operation 610, the LMF at the NR LPP server coordinates the PRS measurement gap occasion with the UE's concurrent SSB measurement to avoid collision between them. At operation 612, the NR LPP server sends an inter-frequency PRS configuration to the UE based on the coordination at the LMF of the PRS measurement gap occasion with the UE's SSB measurement as indicated by SMTC.

At operation 614, the UE may determine a preferred PRS measurement gap pattern index based on the on the inter-frequency PRS pattern. At 616, the UE may send a request to the serving gNB 604 to request the preferred RSTD measurement gap pattern from gNB 604 if there is no other NR RRM measurements, such as Release 16 RRM measurements (SSB RSRP, etc.). The gNB 604 may decode the request from the UE, and may, and at operation 620, in response to a determination that one or more other NR data scheduling events, such as SSB RSRP, which will not overlap with the gap configured for PRS measurement, are to take place, the gNB determines to configure the preferred RSTD measurement gap pattern to the UE. At operation 622, the gNB 604 may send a RRC message to the UE 602 to configure the UE with the preferred RSTD measurement gap pattern using a RRC IE RRCConnectionConfiguration. At operation 624, the UE may perform the PRS measurement within the RSTD measurement gap with MGL>6 ms. In addition, the UE may perform the one or more other NR data scheduling events within the legacy measurement gap MGL<6 ms.

UE Measurement Granularity for New Radio Positioning Measurement:

In the last RAN4 meetings, manners of defining the reporting table for NR positioning measurement was discussed.

Particularly from the UE implementation perspective, the measurement period presents some complexities. Typically, there are several implementation aspects below which are to be taken count into:
a) RSTD measurements cannot be processed in real time, and thus some limited buffering of data and correlation results is needed.
b) Furthermore, as discussed in context of layer 1 (L1) measurement period for the RSTD, it should be set so that it allows UE to do the measurements and calculations also in a serial manner, rather than requiring all the cells being processed simultaneously, in this way alleviating the processing and memory consumption requirements.

Particularly, in the last RAN1 meeting, UE capability for PRS processing and buffering was agreed as R1-2002770 as set forth below in Proposals 1-5 and Observations 6-8:

Proposal 1

For the purpose of DL PRS processing capability, the duration of DL PRS symbols (K) in ms within any P msec window, is calculated by:

Type 1 duration calculation with $K = \Sigma_{s \in S} K_s$ $K_s = T_s^{end} - T_s^{start}$ Type 2 duration calculation with

- $K = \frac{1}{2^\mu}|S|$ where
Type 1 or Type 2 is reported as UE capability,
S is the set of slots of a serving cell within the P msec window in the positioning frequency layer that contains potential DL PRS resources considering the actual nr-DL-PRS-ExpectedRSTD, nr-DL-PRS-ExpectedRSTD-Uncertainty provided for each pair of DL PRS Resource Sets (target and reference).
for Type 1, $[T_s^{start}, T_s^{end}]$ is smallest interval in ms within slots corresponding to an integer number of OFDM symbols of a serving cell that covers the union of the potential PRS symbols and determines the PRS symbol occupancy within slots.
Interval$[T_s^{start}, T_s^{end}]$ considers the actual nr-DL-PRS-ExpectedRSTD, nr-DL-PRS-ExpectedRSTD-Uncertainty provided for each pair of DL PRS Resource Sets (target and reference).

As UE capability on PRS processing depends on the definition of duration (e.g. Type1 and Type2) below, the measurement delay requirements can be defined regarding to type duration calculation as set forth below:

Type 1 duration calculation with $K = \Sigma_{s \in S} K_s$ $K_s = T_s^{end} - T_s^{start}$ Type 2 duration calculation with

- $K = \frac{1}{2^\mu}|S|$

Therefore, we can conclude that: per observation 5: PRS RSTD measurement delay requirement can be determined by:

the periodicity of DL PRS resource the maximum number of DL PRS resource which UE can process within a PRS occasion UE capability on PRS processing Regarding the maximum number of PRS processes within a PRS periodicity, such number depends on UE capability defined by RAN1 as set forth below:

Proposal 2

A second proposal for the purpose of DL PRS processing capability is provided below:

For UE DL PRS processing capability,

UE reports one combination of (N, T) values per band, where N is a duration of DL PRS symbols in ms processed every T ms for a given maximum bandwidth (B) in MHz supported by UE. Note that N may be defined by K, which depends on UE capability type.

Additionally, UE reports a new parameter—number of DL PRS resources that

UE can process in a slot, which is reported per subcarrier spacing (SCS) per band. Values {1, 2, 4, 8, 12, 16, 32, 64}

The following sets of values for N, T and B are supported

Values for N={0.125, 0.25, 0.5, 1, 2, 4, 8, 12, 16, 20, 25, 30, 35, 50, 55, 50} ms Values for T={8, 16, 20, 30, 50, 80, 160, 320, 650, 1280} ms Values for maximum BW reported by UE={5, 10, 20, 50, 50, 80, 100, 200, 500} MHz Proposal 3

A third proposal for the purpose of DL PRS processing capability is provided below:

The reporting of (N, T) values for maximum BW in MHz is not dependent on SCS.

Proposal 4

A fourth proposal for the purpose of DL PRS processing capability is provided below:

UE capability for simultaneous DL PRS processing across positioning frequency layers is not supported in Rel.16 (e.g. for a UE supporting multiple positioning frequency layers, a UE is expected to process one frequency layer at a time)

Proposal 5

A fifth proposal for the purpose of DL PRS processing capability is provided below:

UE capability for DL PRS processing is defined assuming the case with configured measurement gap and a maximum ratio of measurement gap length (MGL)/measurement gap repetition period (MGRP) of no more than X %. That is for the specific PRS resource with configuration ($BW_{PRS}$, $T_{PRS}$) the processing time for PRS resources within a PRS periodicity ($T_{PRS}$), which denoted as $N_{PRS}$ in symbol or slot up to definition of duration time, can be conducted by:

$$N_{PRS} = \frac{N}{T} T_{PRS} \text{ if } BW_{PRS} < B$$

Where:

UE DL PRS processing capability is represented by {N, T, B}, $T_{PRS}$ is the period of PRS resource.

The number of PRS periods need for PRS measurement can be denoted by:

$$Ms = \text{ceil}\left(\frac{L_{PRS\_total}}{N_{PRS}}\right) = \text{ceil}\left(\frac{L_{PRS\_total}}{T_{PRS}} \cdot \frac{T}{N}\right)$$

where the total PRS resource numbers measured by UE is $L_{PRS\_total}$ in unit symbol or slot up to the definition of duration time for UE PRS processing capability.

Thus the measurement delay per PRS measurement layer can be provided by:

$$T_{RSTD\_perlayer,NR} = T_{PRS} \cdot (Ms-1) + N_{PRS} ms$$

Observation 6:

According to a sixth observation, PRS RSTD measurement period per a positioning frequency can be:

$$T_{RSTD\_perlayer,NR} = T_{PRS} \cdot (Ms-1) + N_{PRS} ms$$

where:

$T_{PRS}$ is the PRS resource set periodicity,

Ms is the number of PRS periods need for all PRS resource ($L_{PRS\_total}$) within a PRS measurement occasion $$Ms = \text{ceil}\left(\frac{L_{PRS\_total}}{T_{PRS}} \cdot \frac{T}{N}\right)$$

- $N_{PRS} = \frac{N}{T} T_{PRS}$ if $BW_{PRS} < B$

UE DL PRS processing capability is denoted by {N, T, B}

Beyond the discussion on the basic measurement period per a PRS layer, more open issues are to be considered, such as whether or how to extend the measurement period to account for Rx beam sweeping in frequency range 2 (FR2).

Moreover, meetings on the above topic included discussions as to whether or how to extend the measurement period to account for receive (Rx) beam sweeping in FR2. In our view, UE behaviour to support the PRS measurement in case of RX beam sweeping can be quite similar as that of SSB-based RRM. Therefore, according to one embodiment, we propose that, per observation 7, the scaling factor for PRS measurement delay due to RX beam sweeping can be the same as that in SSB-based RRM measurement in Release 15.

Measurement Period for More than One Frequency Layer

If UE needs to be able to perform the measurement on multiple positioning frequency layers at the same time, the processing complexity and memory consumption can easily be exacerbated by the number of frequency layers to be considered, unless some limitations for the same are set.

As RAN1 has already agreed "UE capability for simultaneous DL PRS processing across positioning frequency layers is not supported in Rel.16." The total measurement delay on the multiple positioning frequency layers shall therefore be the sum of each layer measurement duration in total.

According to observation 7, in case of multiple PRS measurement layers the measurement delay shall be given by:

$$T_{RSTD\_multiple\_layer,NR} = \sum_{i=1}^{N_{PRS\_layer}} T_{RSTD\_perlayer,NR}(i) \quad (ms)$$

where $T_{RSTD\_perlayer,NR}(i)$ is the measurement delay for ith positioning frequency layer, for which UE processing capability is defined as {$N_i$, $T_i$, $B_i$}. It can be calculated by the equation provided immediately above.

If we can define the intra/inter RSTD measurement depending on the positioning frequency layer itself as defined by Proposal 3 above, the number of positioning frequency layers to be measured can be 1 and >1 for intra-frequency measurement and inter-frequency measurement. That is the measurement delay for intra-frequency and inter-frequency RSTD measurements can depend on $T_{RsTD\_perlayer,NR}$ and $T_{RSTD\_multiple\_layer,NR}$ respectively.

Measurement Period with Gap

On the other hand, for the intra-frequency measurement with gap and inter-frequency measurement, the scaling factor corresponding to the measurement gap sharing shall be counted. In our view, the same scaling factor for the gap sharing as the SSB intra/inter measurement can be applied for RSTD measurement.

According to observation 8, for RSTD measurement with gap, the measurement delay extension with the same gap sharing scaling factor as NR standalone (SA) measurements shall be considered.

When network signals "01", "10" or "11" with RRC parameter MeasGapSharingScheme and the value of X is defined as in Table 9.1.2.1a-1 below, $K_{intra}=1/X*100$, $K_{inter}=1/(100-X)*100$.

When network signals "00" indicating equal splitting gap sharing, X is not applied.

The RRC parameter MeasGapSharingScheme shall be applied to the calculation of carrier specific scaling factor as specified in clause 9.1.5.2.2 of TS 38.133.

TABLE 9.1.2.1a-1

Value of parameter X for NR standalone measurement gap sharing

| measGapSharingScheme | Value of X (%) |
|---|---|
| '00' | Equal splitting |
| '01' | 25 |
| '10' | 50 |
| '11' | 75 |

Note:
It is left to UE implementation to determine which measurement gap sharing scheme in the table to be applied, when MeasGapSharingScheme is absent and there is no stored value in the field.

Based on the above, some embodiments propose that the RSTD measurement delay may be defined as set forth in Table 3 below (according to Proposal 3 noted above):

TABLE 3

| Measurement scenario | Measurement delay |
|---|---|
| Intra-frequency measurement w/o gap | $T_{RSTD\_intra\_nonMG,\ NR} = T_{RSTD\_perlayer,\ NR}$ |
| Intra-frequency measurement with gap | $T_{RSTD\_intra\_MG,\ NR} = K_{intra} * T_{RSTD\_perlayer,\ NR}$ |
| Inter-frequency measurement | $T_{RSTD\_inter,NR} = K_{inter} * \sum_{i=1}^{N_{PRS\_layer}} T_{RSTD\_perlayer,NR}(i)$ |

Where:

$T_{RSTD\_perlayer,NR} = T_{PRS} \cdot (MS-1) + N_{PRS}(ms)$ $N_{PRS\_layer}$ is the number of PRS positioning frequency layers Tprs is the PRS resource set periodicity, Ms is the number of PRS periods need for all PRS resource ($L_{PRS\_total}$) within a PRS resource occasion, which $$Ms = \text{ceil}\left(\frac{L_{PRS\_total}}{T_{PRS}} \cdot \frac{T}{N}\right)$$

- $N_{PRS} = \frac{N}{T} T_{PRS}$ if $BW_{PRS} < B$

UE DL PRS processing capability is indicated by {N, T, B}

$K_{intra}=1/X*100, K_{inter}=1/(100-X)*100$,

Value of parameter X can be same as that for NR SA measurement gap sharing defined in Table 9.1.2.1a-1 in 3GPP TS38.133 v16.3.0

Example Procedures

In some embodiments, the electronic device(s), network (s), system(s), chip(s) or component(s), or portions or implementations thereof, of FIGS. 1-3, or some other figure herein, may be configured to perform one or more processes, techniques, or methods as described herein, or portions thereof. One such process is depicted in FIG. 9. In some embodiments, the process of FIG. 9 may be performed by a service producer of a wireless cellular network.

Figure 7:
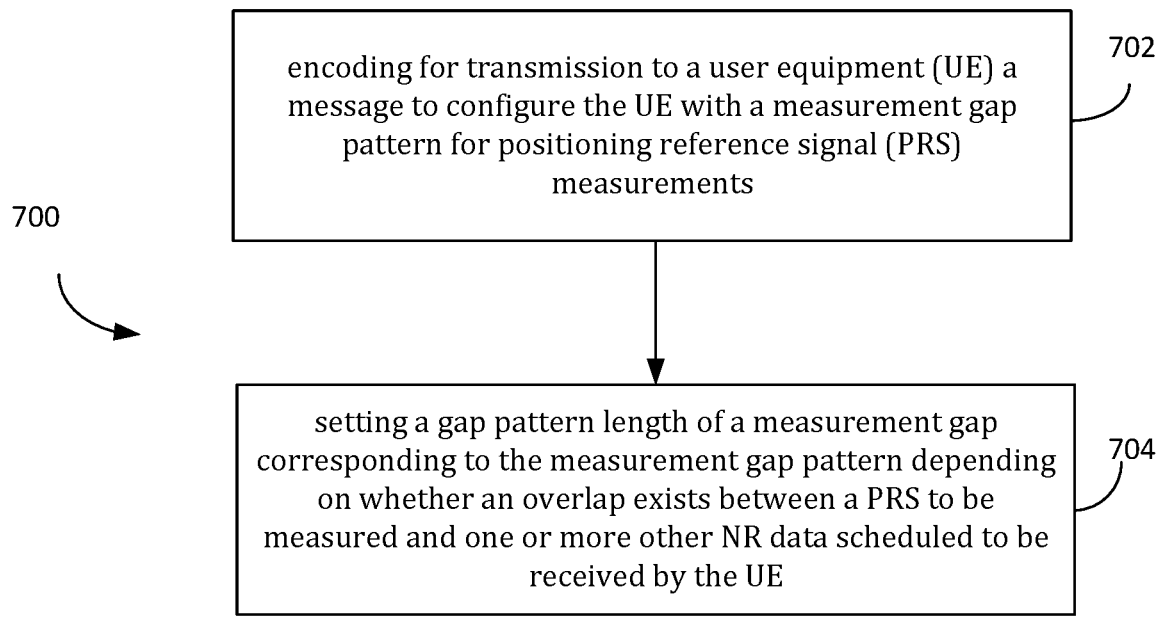
FIG. 7 is a flow chart of a first process according to some embodiments.

Referring to FIG. 7, a process 700 to be performed at an apparatus of a NR gNB includes: at operation 702, encoding for transmission to a user equipment (UE) a message to configure the UE with a measurement gap pattern for an inter-frequency positioning reference signal (PRS) measurements; and at operation 704, setting a gap pattern length of a measurement gap corresponding to the measurement gap pattern depending on whether an overlap exists between a PRS to be measured and one or more other NR data scheduled to be received by the UE.

Figure 8:
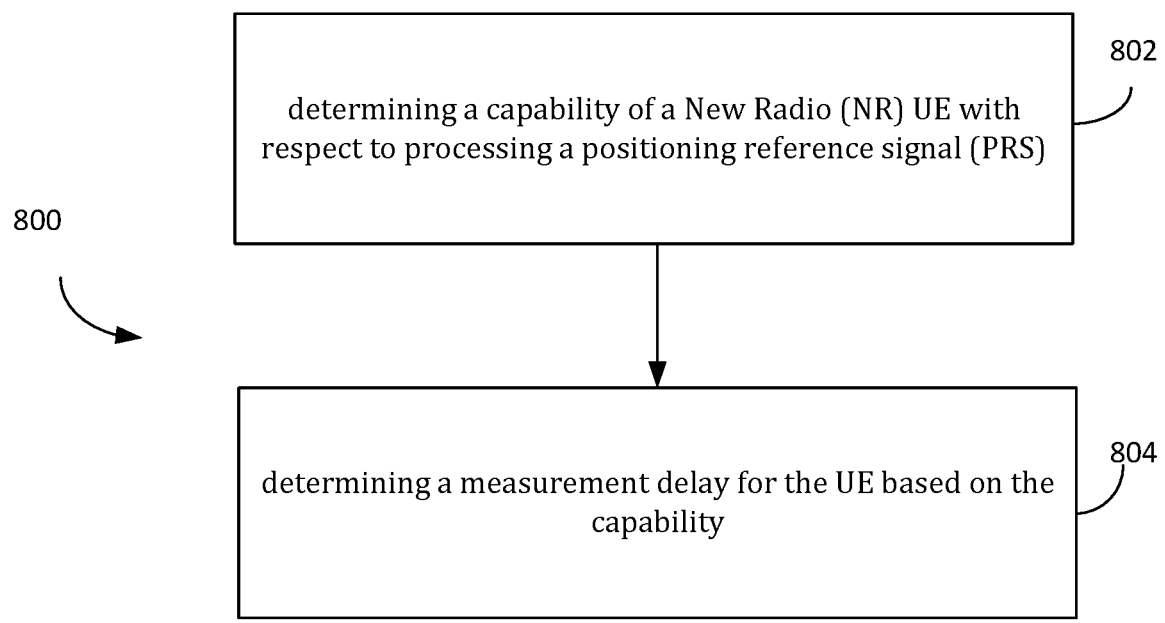
FIG. 8 is a flow chart of a second process according to some embodiments.

Referring to FIG. 8, a process 800 to be performed at one of a UE, a network entity such as a gNB includes: at operation 802, determining a capability of a New Radio (NR) UE with respect to processing a positioning reference signal (PRS); and at operation 804, determining a measurement delay for the UE based on the capability.

For example, another process may include receiving configuration information to indicate a gap pattern for an inter-frequency PRS measurement, wherein a length of the gap pattern is longer than 6 ms if the PRS measurement does not overlap with a NR RRM measurement, and performing the inter-frequency PRS measurement based on the indicated gap pattern.

For example, another process may include receiving PRS pattern information from a NR-PP server. The process may further include determining an inter-frequency RSTD measurement gap pattern based on the PRS pattern information, encoding, for transmission to a serving gNB of the UE, an indication of the determined inter-frequency RSTD measurement gap pattern. In some embodiments, the process may further include receiving a gap pattern to use for inter-frequency PRS measurements, which may be the same or different than the determined gap pattern (e.g., based on whether there are ongoing RRM measurements for the UE).

For example, another process may include determining whether a UE is to perform one or more RRM measurements, selecting a gap pattern for inter-frequency PRS measurements of the UE based on the determination. In some embodiments, the gap pattern may be selected further based on a gap pattern that is requested by the UE, and encoding, for transmission to the UE, an indication of the selected gap pattern.

For example, another process may include receiving, from a serving gNB, an SMTC configured for a UE. The process may further include determining an inter-frequency PRS configuration for the UE based on the SMTC.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes an apparatus of a New Radio (NR) Node B (gNB) including a memory and one or more processors coupled to the memory, the one or more processors to: encode for transmission to a user equipment (UE) a message to configure the UE with a measurement gap pattern for a positioning reference signal (PRS) measurements; and set a gap pattern length of a measurement gap corresponding to the measurement gap pattern depending on whether an overlap exists between a scheduling of a PRS to be measured and a scheduling of one or more other NR data for receipt by the UE.

Example 2 includes the subject matter of Example 1, wherein the one or more processors are to set the gap pattern length to be greater than 6 ms in response to a determination that an overlap does not exists, and to be less than 6 ms in response to a determination that the overlap exists.

Example 3 includes the subject matter of Example 1, wherein the one or more processors are to determine that the overlap exists, and in response to a determination that the overlap exists, override the measurement gap pattern for the PRS measurements by setting the gap pattern length to correspond to a gap pattern length associated with one or more other NR data scheduled to be received by the UE.

Example 4 includes the subject matter of Example 1, wherein the measurement gap pattern for the PRS measurements corresponds to a shared measurement gap pattern that is shared between the PRS measurements and the one or more other NR data.

Example 5 includes the subject matter of Example 1, wherein the one or more processors are further to decode a request from the UE including an indication of a preferred reference signal time difference (RSTD) measurement gap pattern, the preferred RSTD measurement gap pattern based on an PRS configuration message to the UE from a NR location positioning protocol server (LPP).

Example 6 includes the subject matter of Example 5, wherein the indication includes a pattern index.

Example 7 includes the subject matter of any one of Examples 5-6, wherein: the request is in response to a determination that an overlap does not exists; the message to configure the UE with the measurement gap pattern is a first message to configure the UE with a first measurement gap pattern, the first message being in response to the request, the first measurement gap pattern corresponding to the preferred RSTD measurement gap pattern; the one or more processors to further encode, in response to a determination that the overlap exists, a second message to configure the UE with a second measurement gap pattern corresponding to a measurement gap pattern that has a measurement gap length associated with the one or more other NR data; and the preferred RSTD measurement gap pattern is to be used by the UE during the PRS measurements, and the second measurement gap pattern to be used by the UE during the scheduling of the one or more other NR data.

Example 8 includes the subject matter of any one of Examples 5-6, wherein: the message to configure the UE with the measurement gap pattern is a first message to configure the UE with a first measurement gap pattern, the first measurement gap pattern corresponding to a shared measurement gap pattern that is shared between the PRS measurements and the one or more other NR data; the request is in response to a determination that an overlap does not exists; the one or more processors to further encode, in response to the request, a second message to configure the UE with a second measurement gap pattern corresponding to the preferred RSTD measurement gap pattern, the preferred RSTD measurement gap pattern having a measurement gap length longer than a measurement gap length of the shared measurement gap pattern; and the shared measurement gap pattern is to be used by the UE during the scheduling of the one or more other NR data, and the preferred RSTD measurement gap pattern is to be used by the UE during the PRS measurements.

Example 9 includes the subject matter of Example 5, wherein the one or more processors are further to encode for transmission to a location management function (LMF) of the NR LPP server a message including synchronization signal block (SSB) measurement timing configuration (MTC) (SMTC) information regarding a shared measurement gap pattern that is shared between the PRS measurements and the one or more other NR data.

Example 10 includes the subject matter of Example 9, wherein the PRS configuration message to the UE from the NR LPP server is based on a coordination by a location management function (LMF) of the NR LPP server to avoid collision between the PRS measurements and the one or more other NR data.

Example 11 includes the subject matter of any one of Examples 1-10, wherein the measurement gap pattern for the PRS measurements includes a measurement gap period of 80 ms for a measurement gap length of 10 ms, and a measurement gap period of 160 ms for a measurement gap length of 20 ms, or a measurement gap length of 40 ms.

Example 12 includes the subject matter of any one of Examples 1-11, wherein the one or more other NR data include at least one of a synchronization signal block (SSB) reference signal received power (RSRP) (SSB RSRP) measurement or a channel state information (CSI) RSRP (CSI-RSRP) measurement.

Example 13 includes the subject matter of any one of Examples 1-12, wherein the message to configure the UE with the measurement gap pattern is a radio resource control (RRC) message.

Example 14 includes the subject matter of any one of Examples 1-13, further including a radio frequency circuitry, a radio frequency front-end module, and one or more antennas coupled to the one or more processors, the antennas to transmit and receive wireless signals.

Example 15 tangible non-transitory machine-readable storage medium storing instructions which, upon execution by one or more processors of a New Radio (NR) Node B (gNB), are to cause the one or more processors to perform operations including: encoding for transmission to a user equipment (UE) a message to configure the UE with a measurement gap pattern for a positioning reference signal (PRS) measurements; and setting a gap pattern length of a measurement gap corresponding to the measurement gap pattern depending on whether an overlap exists between a scheduling of a PRS to be measured and a scheduling of one or more other NR data for receipt by the UE.

Example 16 includes the subject matter of Example 15, wherein the operations further include setting the gap pattern length to be greater than 6 ms in response to a determination that an overlap does not exists, and to be less than 6 ms in response to a determination that the overlap exists.

Example 17 includes the subject matter of Example 15, wherein the operations further include determining that the overlap exists, and in response to a determination that the overlap exists, overriding the measurement gap pattern for the PRS measurements by setting the gap pattern length to correspond to a gap pattern length associated with one or more other NR data scheduled to be received by the UE.

Example 18 includes the subject matter of Example 15, wherein the measurement gap pattern for the PRS measurements corresponds to a shared measurement gap pattern that is shared between the PRS measurements and the one or more other NR data.

Example 19 includes the subject matter of Example 15, wherein the operations further include decoding a request from the UE including an indication of a preferred reference signal time difference (RSTD) measurement gap pattern, the preferred RSTD measurement gap pattern based on an PRS configuration message to the UE from a NR location positioning protocol server (LPP).

Example 20 includes the subject matter of Example 19, wherein the indication includes a pattern index.

Example 21 includes the subject matter of any one of Examples 19-20, wherein: the request is in response to a determination that an overlap does not exists; the message to configure the UE with the measurement gap pattern is a first message to configure the UE with a first measurement gap pattern, the first message being in response to the request, the first measurement gap pattern corresponding to the preferred RSTD measurement gap pattern; the operations further include encoding, in response to a determination that the overlap exists, a second message to configure the UE with a second measurement gap pattern corresponding to a measurement gap pattern that has a measurement gap length associated with the one or more other NR data; and the preferred RSTD measurement gap pattern is to be used by the UE during the PRS measurements, and the second measurement gap pattern to be used by the UE during the scheduling of the one or more other NR data.

Example 22 includes the subject matter of any one of Examples 19-20, wherein: the message to configure the UE with the measurement gap pattern is a first message to configure the UE with a first measurement gap pattern, the first measurement gap pattern corresponding to a shared measurement gap pattern that is shared between the PRS measurements and the one or more other NR data; the request is in response to a determination that an overlap does not exists; the operations further include encoding, in response to the request, a second message to configure the UE with a second measurement gap pattern corresponding to the preferred RSTD measurement gap pattern, the preferred RSTD measurement gap pattern having a measurement gap length longer than a measurement gap length of the shared measurement gap pattern; and the shared measurement gap pattern is to be used by the UE during the scheduling of the one or more other NR data, and the preferred RSTD measurement gap pattern is to be used by the UE during the PRS measurements.

Example 23 includes the subject matter of Example 19, wherein the operations further include encoding for transmission to a location management function (LMF) of the NR LPP server a message including synchronization signal block (SSB) measurement timing configuration (MTC) (SMTC) information regarding a shared measurement gap pattern that is shared between the PRS measurements and the one or more other NR data.

Example 24 includes the subject matter of Example 23, wherein the PRS configuration message to the UE from the NR LPP server is based on a coordination by a location management function (LMF) of the NR LPP server to avoid collision between the PRS measurements and the one or more other NR data.

Example 25 includes the subject matter of any one of Examples 15-24, wherein the measurement gap pattern for the PRS measurements includes a measurement gap period of 80 ms for a measurement gap length of 10 ms, and a measurement gap period of 160 ms for a measurement gap length of 20 ms, or a measurement gap length of 40 ms.

Example 26 includes the subject matter of any one of Examples 15-25, wherein the one or more other NR data include at least one of a synchronization signal block (SSB) reference signal received power (RSRP) (SSB RSRP) measurement or a channel state information (CSI) RSRP (CSI-RSRP) measurement.

Example 27 includes the subject matter of any one of Examples 15-26, wherein the message to configure the UE with the measurement gap pattern is a radio resource control (RRC) message.

Example 28 includes a method to be performed at one or more processors of a New Radio (NR) Node B (gNB), the method including: encoding for transmission to a user equipment (UE) a message to configure the UE with a measurement gap pattern for a positioning reference signal (PRS) measurements; and setting a gap pattern length of a measurement gap corresponding to the measurement gap pattern depending on whether an overlap exists between a scheduling of a PRS to be measured and a scheduling of one or more other NR data for receipt by the UE.

Example 29 includes the subject matter of Example 28, further including setting the gap pattern length to be greater than 6 ms in response to a determination that an overlap does not exists, and to be less than 6 ms in response to a determination that the overlap exists.

Example 30 includes the subject matter of Example 28, further including determining that the overlap exists, and in response to a determination that the overlap exists, overriding the measurement gap pattern for the PRS measurements by setting the gap pattern length to correspond to a gap pattern length associated with one or more other NR data scheduled to be received by the UE.

Example 31 includes the subject matter of Example 28, wherein the measurement gap pattern for the PRS measurements corresponds to a shared measurement gap pattern that is shared between the PRS measurements and the one or more other NR data.

Example 32 includes the subject matter of Example 28, further including decoding a request from the UE including an indication of a preferred reference signal time difference (RSTD) measurement gap pattern, the preferred RSTD measurement gap pattern based on an PRS configuration message to the UE from a NR location positioning protocol server (LPP).

Example 33 includes the subject matter of Example 32, wherein the indication includes a pattern index.

Example 34 includes the subject matter of any one of Examples 32-33, wherein: the request is in response to a determination that an overlap does not exists; the message to configure the UE with the measurement gap pattern is a first message to configure the UE with a first measurement gap pattern, the first message being in response to the request, the first measurement gap pattern corresponding to the preferred RSTD measurement gap pattern; the method further includes encoding, in response to a determination that the overlap exists, a second message to configure the UE with a second measurement gap pattern corresponding to a measurement gap pattern that has a measurement gap length associated with the one or more other NR data; and the preferred RSTD measurement gap pattern is to be used by the UE during the PRS measurements, and the second measurement gap pattern to be used by the UE during the scheduling of the one or more other NR data.

Example 35 includes the subject matter of any one of Examples 32-33, wherein: the message to configure the UE with the measurement gap pattern is a first message to configure the UE with a first measurement gap pattern, the first measurement gap pattern corresponding to a shared measurement gap pattern that is shared between the PRS measurements and the one or more other NR data; the request is in response to a determination that an overlap does not exists; the method further includes encoding, in response to the request, a second message to configure the UE with a second measurement gap pattern corresponding to the preferred RSTD measurement gap pattern, the preferred RSTD measurement gap pattern having a measurement gap length longer than a measurement gap length of the shared measurement gap pattern; and the shared measurement gap pattern is to be used by the UE during the scheduling of the one or more other NR data, and the preferred RSTD measurement gap pattern is to be used by the UE during the PRS measurements.

Example 36 includes the subject matter of Example 32, further including encoding for transmission to a location management function (LMF) of the NR LPP server a message including synchronization signal block (SSB) measurement timing configuration (MTC) (SMTC) information regarding a shared measurement gap pattern that is shared between the PRS measurements and the one or more other NR data.

Example 37 includes the subject matter of Example 36, wherein the PRS configuration message to the UE from the NR LPP server is based on a coordination by a location management function (LMF) of the NR LPP server to avoid collision between the PRS measurements and the one or more other NR data.

Example 38 includes the subject matter of any one of Examples 28-37, wherein the measurement gap pattern for the PRS measurements includes a measurement gap period of 80 ms for a measurement gap length of 10 ms, and a measurement gap period of 160 ms for a measurement gap length of 20 ms, or a measurement gap length of 40 ms.

Example 39 includes the subject matter of any one of Examples 28-38, wherein the one or more other NR data include at least one of a synchronization signal block (SSB) reference signal received power (RSRP) (SSB RSRP) measurement or a channel state information (CSI) RSRP (CSI-RSRP) measurement.

Example 40 includes the subject matter of any one of Examples 28-39, wherein the message to configure the UE with the measurement gap pattern is a radio resource control (RRC) message.

Example 41 includes an apparatus of a New Radio (NR) User Equipment including a memory and one or more processors coupled to the memory, the one or more processors to: decode a message from a NR Node B (gNB) to configure the UE with a measurement gap pattern for a positioning reference signal (PRS) measurements, wherein a gap pattern length of the measurement gap pattern is based on depending on whether an overlap exists between a scheduling of a PRS to be measured and a scheduling of one or more other NR data for receipt by the UE; and use the measurement gap pattern during the PRS measurements.

Example 42 includes the subject matter of Example 41, wherein the gap pattern length is greater than 6 ms in response to a determination that an overlap does not exists, and is less than 6 ms in response to a determination that the overlap exists.

Example 43 includes the subject matter of Example 41, wherein in response to a determination that the overlap exists, the gap pattern length is to correspond to a gap pattern length associated with one or more other NR data scheduled to be received by the UE rather than the measurement gap pattern for the PRS measurements.

Example 44 includes the subject matter of Example 41, wherein the measurement gap pattern for the PRS measurements corresponds to a shared measurement gap pattern that is shared between the PRS measurements and the one or more other NR data.

Example 45 includes the subject matter of Example 41, wherein the one or more processors are further to decode an PRS configuration message from a NR location positioning protocol server (LPP).

Example 46 includes the subject matter of Example 45, wherein the one or more processors are further to encode a request to the gNB including an indication of a preferred reference signal time difference (RSTD) measurement gap pattern, the preferred RSTD measurement gap pattern based on the PRS configuration message to the UE from the NR LPP.

Example 47 includes the subject matter of Example 46, wherein the indication includes a pattern index.

Example 48 includes the subject matter of any one of Examples 45-47, wherein: the request is in response to a determination that an overlap does not exists; the message to configure the UE with the measurement gap pattern is a first message to configure the UE with a first measurement gap pattern, the first message being in response to the request, the first measurement gap pattern corresponding to the preferred RSTD measurement gap pattern; the one or more processors to further decode a second message from the gNB to configure the UE with a second measurement gap pattern corresponding to a measurement gap pattern that has a measurement gap length associated with the one or more other NR data, the second message in response to a determination that the overlap exists; and the one or more processors are to use the RSTD measurement gap pattern during the PRS measurements, and to use the second measurement gap pattern during the scheduling of the one or more other NR data.

Example 49 includes the subject matter of any one of Examples 45-47, wherein: the message to configure the UE with the measurement gap pattern is a first message to configure the UE with a first measurement gap pattern, the first measurement gap pattern corresponding to a shared measurement gap pattern that is shared between the PRS measurements and the one or more other NR data; the request is in response to a determination that an overlap does not exists; the one or more processors to further decode a second message from the gNB to configure the UE with a second measurement gap pattern corresponding to the preferred RSTD measurement gap pattern, the preferred RSTD measurement gap pattern having a measurement gap length longer than a measurement gap length of the shared measurement gap pattern; and the one or more processors are to use the shared measurement gap pattern during the scheduling of the one or more other NR data, and to use the preferred RSTD measurement gap pattern during the PRS measurements.

Example 50 includes the subject matter of Example 45, wherein the PRS configuration message to the UE from the NR LPP server is based on a coordination by a location management function (LMF) of the NR LPP server to avoid collision between the PRS measurements and the one or more other NR data.

Example 51 includes the subject matter of any one of Examples 41-50, wherein the measurement gap pattern for the PRS measurements includes a measurement gap period of 80 ms for a measurement gap length of 10 ms, and a measurement gap period of 160 ms for a measurement gap length of 20 ms, or a measurement gap length of 40 ms.

Example 52 includes the subject matter of any one of Examples 41-51, wherein the one or more other NR data include at least one of a synchronization signal block (SSB) reference signal received power (RSRP) (SSB RSRP) measurement or a channel state information (CSI) RSRP (CSI-RSRP) measurement.

Example 53 includes the subject matter of any one of Examples 41-52, wherein the message to configure the UE with the measurement gap pattern is a radio resource control (RRC) message.

Example 54 includes the subject matter of any one of Examples 41-53, further including a radio front end module and one or more antennas coupled to the one or more processors to transmit and receive wireless signals.

Example 55 includes a tangible, non-transitory storage medium storing instructions which, upon execution by one or more processors of a New Radio (NR) User Equipment, are to cause the one or more processors to perform operations including: decoding a message from a NR Node B (gNB) to configure the UE with a measurement gap pattern for a positioning reference signal (PRS) measurements, wherein a gap pattern length of the measurement gap pattern is based on depending on whether an overlap exists between a scheduling of a PRS to be measured and a scheduling of one or more other NR data for receipt by the UE; and using the measurement gap pattern during the PRS measurements.

Example 56 includes the subject matter of Example 55, wherein the gap pattern length is greater than 6 ms in response to a determination that an overlap does not exists, and is less than 6 ms in response to a determination that the overlap exists.

Example 57 includes the subject matter of Example 55, wherein in response to a determination that the overlap exists, the gap pattern length is to correspond to a gap pattern length associated with one or more other NR data scheduled to be received by the UE rather than the measurement gap pattern for the PRS measurements.

Example 58 includes the subject matter of Example 55, wherein the measurement gap pattern for the PRS measurements corresponds to a shared measurement gap pattern that is shared between the PRS measurements and the one or more other NR data.

Example 59 includes the subject matter of Example 55, wherein the operations further include decoding an PRS configuration message from a NR location positioning protocol server (LPP).

Example 60 includes the subject matter of Example 59, wherein the operations further include encoding a request to the gNB including an indication of a preferred reference signal time difference (RSTD) measurement gap pattern, the preferred RSTD measurement gap pattern based on the PRS configuration message to the UE from the NR LPP.

Example 61 includes the subject matter of Example 60, wherein the indication includes a pattern index.

Example 62 includes the subject matter of any one of Examples 59-61, wherein: the request is in response to a determination that an overlap does not exists; the message to configure the UE with the measurement gap pattern is a first message to configure the UE with a first measurement gap pattern, the first message being in response to the request, the first measurement gap pattern corresponding to the preferred RSTD measurement gap pattern; the operations further including decoding a second message from the gNB to configure the UE with a second measurement gap pattern corresponding to a measurement gap pattern that has a measurement gap length associated with the one or more other NR data, the second message in response to a determination that the overlap exists; and the operations further including using the RSTD measurement gap pattern during the PRS measurements, and to use the second measurement gap pattern during the scheduling of the one or more other NR data.

Example 63 includes the subject matter of any one of Examples 59-61, wherein: the message to configure the UE with the measurement gap pattern is a first message to configure the UE with a first measurement gap pattern, the first measurement gap pattern corresponding to a shared measurement gap pattern that is shared between the PRS measurements and the one or more other NR data; the request is in response to a determination that an overlap does not exists; the operations further including decoding a second message from the gNB to configure the UE with a second measurement gap pattern corresponding to the preferred RSTD measurement gap pattern, the preferred RSTD measurement gap pattern having a measurement gap length longer than a measurement gap length of the shared measurement gap pattern; and the operations further include using the shared measurement gap pattern during the scheduling of the one or more other NR data, and to use the preferred RSTD measurement gap pattern during the PRS measurements.

Example 64 includes the subject matter of Example 59, wherein the PRS configuration message to the UE from the NR LPP server is based on a coordination by a location management function (LMF) of the NR LPP server to avoid collision between the PRS measurements and the one or more other NR data.

Example 65 includes the subject matter of any one of Examples 55-64, wherein the measurement gap pattern for the PRS measurements includes a measurement gap period of 80 ms for a measurement gap length of 10 ms, and a measurement gap period of 160 ms for a measurement gap length of 20 ms, or a measurement gap length of 40 ms.

Example 66 includes the subject matter of any one of Examples 55-65, wherein the one or more other NR data include at least one of a synchronization signal block (SSB)

reference signal received power (RSRP) (SSB RSRP) measurement or a channel state information (CSI) RSRP (CSI-RSRP) measurement.

Example 67 includes the subject matter of any one of Examples 55-66, wherein the message to configure the UE with the measurement gap pattern is a radio resource control (RRC) message.

Example 68 includes a method to be performed at one or more processors of a New Radio (NR) User Equipment, the method including: decoding a message from a NR Node B (gNB) to configure the UE with a measurement gap pattern for a positioning reference signal (PRS) measurements, wherein a gap pattern length of the measurement gap pattern is based on depending on whether an overlap exists between a scheduling of a PRS to be measured and a scheduling of one or more other NR data for receipt by the UE; and using the measurement gap pattern during the PRS measurements.

Example 69 includes the subject matter of Example 68, wherein the gap pattern length is greater than 6 ms in response to a determination that an overlap does not exists, and is less than 6 ms in response to a determination that the overlap exists.

Example 70 includes the subject matter of Example 68, wherein in response to a determination that the overlap exists, the gap pattern length is to correspond to a gap pattern length associated with one or more other NR data scheduled to be received by the UE rather than the measurement gap pattern for the PRS measurements.

Example 71 includes the subject matter of Example 68, wherein the measurement gap pattern for the PRS measurements corresponds to a shared measurement gap pattern that is shared between the PRS measurements and the one or more other NR data.

Example 72 includes the subject matter of Example 68, the method further includes decoding an PRS configuration message from a NR location positioning protocol server (LPP).

Example 73 includes the subject matter of Example 72, the method further including encoding a request to the gNB including an indication of a preferred reference signal time difference (RSTD) measurement gap pattern, the preferred RSTD measurement gap pattern based on the PRS configuration message to the UE from the NR LPP.

Example 74 includes the subject matter of Example 73, wherein the indication includes a pattern index.

Example 75 includes the subject matter of any one of Examples 72-74, wherein: the request is in response to a determination that an overlap does not exists; the message to configure the UE with the measurement gap pattern is a first message to configure the UE with a first measurement gap pattern, the first message being in response to the request, the first measurement gap pattern corresponding to the preferred RSTD measurement gap pattern; the method further includes decoding a second message from the gNB to configure the UE with a second measurement gap pattern corresponding to a measurement gap pattern that has a measurement gap length associated with the one or more other NR data, the second message in response to a determination that the overlap exists; and the method further including using the RSTD measurement gap pattern during the PRS measurements, and to use the second measurement gap pattern during the scheduling of the one or more other NR data.

Example 76 includes the subject matter of any one of Examples 72-74, wherein: the message to configure the UE with the measurement gap pattern is a first message to configure the UE with a first measurement gap pattern, the first measurement gap pattern corresponding to a shared measurement gap pattern that is shared between the PRS measurements and the one or more other NR data; the request is in response to a determination that an overlap does not exists; the method further includes decoding a second message from the gNB to configure the UE with a second measurement gap pattern corresponding to the preferred RSTD measurement gap pattern, the preferred RSTD measurement gap pattern having a measurement gap length longer than a measurement gap length of the shared measurement gap pattern; and the method further including using the shared measurement gap pattern during the scheduling of the one or more other NR data, and to use the preferred RSTD measurement gap pattern during the PRS measurements.

Example 77 includes the subject matter of Example 72, wherein the PRS configuration message to the UE from the NR LPP server is based on a coordination by a location management function (LMF) of the NR LPP server to avoid collision between the PRS measurements and the one or more other NR data.

Example 78 includes the subject matter of any one of Examples 68-77, wherein the measurement gap pattern for the PRS measurements includes a measurement gap period of 80 ms for a measurement gap length of 10 ms, and a measurement gap period of 173 ms for a measurement gap length of 20 ms, or a measurement gap length of 40 ms.

Example 79 includes the subject matter of any one of Examples 68-78, wherein the one or more other NR data include at least one of a synchronization signal block (SSB) reference signal received power (RSRP) (SSB RSRP) measurement or a channel state information (CSI) RSRP (CSI-RSRP) measurement.

Example 80 includes the subject matter of any one of Examples 68-79, wherein the message to configure the UE with the measurement gap pattern is a radio resource control (RRC) message.

Example 81 includes a method to be performed at a New Radio (NR) location positioning protocol server, the method comprising: receiving, from a serving NR Node B (gNB), a synchronization signal block measurement timing configuration (SMTC) configured for a UE; and determining a positioning reference signal (PRS) configuration for the UE based on the SMTC.

Example 82 includes the subject matter of Example 81, wherein the PRS configuration is determined based on avoiding collision with the SMTC.

Example 83 includes the subject matter of Example 81, wherein the method is to be performed at a location management function of the NR LPP server thereof.

Example 84 includes a method to be performed at a New Radio (NR) User Equipment (UE), the method including: performing UE measurements for NR positioning, wherein a UE measurement delay for the NR positioning is based on UE capability on PRS processing; and causing transmission to a NR Node B (gNB) of a message including the measurements.

Example 85 includes the subject matter of Example 84, wherein the measurements include at least one of intra-frequency measurements and measurements distinguished by a positioning frequency layer based on which the UE measurements are performed.

Example 86 includes the subject matter of Example 85, wherein the intra-frequency measurements are performed with or without a measurement gap.

Example 87 includes the subject matter of Example 84, wherein the UE measurement delay for intra-frequency measurements is based on a single positioning frequency layer.

Example 88 includes the subject matter of Example 84, wherein the UE measurement delay for measurements is based on measurements on all positioning frequency layers based on which the UE measurements are made.

Example 89 includes the subject matter of Example 84, wherein a UE PRS measurement processing capability for the UE is defined by {N, T, B}

Example 90 includes the subject matter of Example 84, wherein the UE measurements for NR positioning include at least one of a positioning reference signa (PRS) reference signal time difference (RSTD) measurements, PRS reference signal receive power (RSRP) measurements, or UE receive-transmit (RX-TX) time difference measurements.

Example 91 includes a method including: determining a capability of a New Radio (NR) UE with respect to processing a positioning reference signal (PRS); and determining a measurement delay for the UE based on the capability.

Example 92 includes the subject matter of Example 91, wherein the capability is determined based on N, T, and/or B.

Example 93 includes the subject matter of any one of Examples 91-92, wherein the measurement delay is for the UE providing one or more measurements on the PRS.

Example 94 includes the subject matter of Example 93, wherein the one or more measurements include at least one of a positioning reference signa (PRS) reference signal time difference (RSTD) measurements, PRS reference signal receive power (RSRP) measurements, or UE receive-transmit (RX-TX) time difference measurements.

Example 95 includes the subject matter of any one of Examples 91-94, wherein the method is performed by one of the UE or a network entity.

Example 96 includes the subject matter of Example 95, wherein the network entity is a NR Node B (gNB).

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus of a New Radio (NR) Node B (gNB) including a memory storing instructions, and one or more processors coupled to the memory to execute the instructions to:
    encode for transmission to a user equipment (UE) a message to configure the UE with a measurement gap pattern for positioning reference signal (PRS) measurements; and
    set a gap pattern length of a measurement gap corresponding to the measurement gap pattern depending on whether an overlap exists between a PRS to be measured and one or more other NR data scheduled to be received by the UE.

2. The apparatus of claim 1, wherein the one or more processors are to set the gap pattern length to be greater than 6 ms in response to a determination that an overlap does not exist, and to be less than 6 ms in response to a determination that the overlap exists.

3. The apparatus of claim 1, wherein the one or more processors are to determine that the overlap exists, and in response to a determination that the overlap exists, override the measurement gap pattern for the PRS measurements by setting the gap pattern length to correspond to a gap pattern length associated with one or more other NR data scheduled to be received by the UE.

4. The apparatus of claim 1, wherein the measurement gap pattern for the PRS measurements corresponds to a shared measurement gap pattern that is shared between the PRS measurements and one or more other NR data scheduled to be received by the UE events.

5. The apparatus of claim 1, wherein the one or more processors are further to decode a request from the UE including an indication of a preferred reference signal time difference (RSTD) measurement gap pattern, the preferred RSTD measurement gap pattern based on a PRS configuration message to the UE from a NR location positioning protocol server (LPP).

6. The apparatus of claim 5, wherein the indication includes a pattern index.

7. The apparatus of claim 5, wherein: the request is in response to a determination that an overlap does not exist; the message to configure the UE with the measurement gap pattern is a first message to configure the UE with a first measurement gap pattern, the first message being in response to the request, the first measurement gap pattern corresponding to the preferred RSTD measurement gap pattern; the one or more processors to further encode, in response to a determination that the overlap exists, a second message to configure the UE with a second measurement gap pattern corresponding to a measurement gap pattern that has a measurement gap length associated with one or more other NR data scheduling events; and the preferred RSTD measurement gap pattern is to be used by the UE during the PRS measurements, and the second measurement gap pattern to be used by the UE during the one or more other NR data scheduling events.

8. The apparatus of claim 5, wherein: the message to configure the UE with the measurement gap pattern is a first message to configure the UE with a first measurement gap pattern, the first measurement gap pattern corresponding to a shared measurement gap pattern that is shared between the PRS measurements and one or more other NR data scheduling events; the request is in response to a determination that an overlap does not exist; the one or more processors to further encode, in response to the request, a second message to configure the UE with a second measurement gap pattern corresponding to the preferred RSTD measurement gap pattern, the preferred RSTD measurement gap pattern having a measurement gap length longer than a measurement gap length of the shared measurement gap pattern; and the shared measurement gap pattern is to be used by the UE during the one or more other NR data scheduling events, and the preferred RSTD measurement gap pattern is to be used by the UE during the PRS measurements.

9. The apparatus of claim 5, wherein the one or more processors are further to encode for transmission to a location management function (LMF) of the NR LPP server a message including synchronization signal block (SSB) measurement timing configuration (MTC) (SMTC) information regarding a shared measurement gap pattern that is shared between the PRS measurements and one or more other NR data scheduling events.

10. The apparatus of claim 9, wherein the PRS configuration message to the UE from the NR LPP server is based on a coordination by a location management function (LMF) of the NR LPP server to avoid collision between the PRS measurements and the one or more other NR data scheduling events.

11. The apparatus of claim 1, wherein the measurement gap pattern for the PRS measurements includes a measurement gap period of 80 ms for a measurement gap length of 10 ms, and a measurement gap period of 160 ms for a measurement gap length of 20 ms, or a measurement gap length of 40 ms.

12. The apparatus of claim 1, wherein one or more other NR data scheduling events include at least one of a synchronization signal block (SSB) reference signal received power (RSRP) (SSB RSRP) measurement or a channel state information (CSI) RSRP (CSI-RSRP) measurement.

13. The apparatus of claim 1, further including a radio frequency circuitry, a radio frequency front-end module, and one or more antennas coupled to the one or more processors, the antennas to transmit and receive wireless signals.

14. A tangible non-transitory machine-readable storage medium storing instructions which, upon execution by one or more processors of a New Radio (NR) Node B (gNB), are to cause the one or more processors to perform operations including: encoding for transmission to a user equipment (UE) a message to configure the UE with a measurement gap pattern for positioning reference signal (PRS) measurements; and setting a gap pattern length of a measurement gap corresponding to the measurement gap pattern depending on whether an overlap exists between a PRS to be measured and one or more other NR data scheduled to be received by the UE.

15. The storage medium of claim 14, wherein the operations further include setting the gap pattern length to be greater than 6 ms in response to a determination that an overlap does not exist, and to be less than 6 ms in response to a determination that the overlap exists.

16. The storage medium of claim 14, wherein the operations further include determining that the overlap exists, and in response to a determination that the overlap exists, overriding the measurement gap pattern for the PRS measurements by setting the gap pattern length to correspond to a gap pattern length associated with the one or more other NR data scheduled to be received by the UE.

17. The storage medium of claim 14, wherein the measurement gap pattern for the PRS measurements corresponds to a shared measurement gap pattern that is shared between the PRS measurements and one or more other NR data scheduling events.

18. The storage medium of claim 14, wherein the operations further include decoding a request from the UE including an indication of a preferred reference signal time difference (RSTD) measurement gap pattern, the preferred RSTD measurement gap pattern based on an inter-frequency PRS configuration message to the UE from a NR location positioning protocol server (LPP).

19. The storage medium of claim 18, wherein the indication includes a pattern index.

20. The storage medium of claim 18, wherein: the request is in response to a determination that an overlap does not exist; the message to configure the UE with the measurement gap pattern is a first message to configure the UE with a first measurement gap pattern, the first message being in response to the request, the first measurement gap pattern corresponding to the preferred RSTD measurement gap pattern; the operations further include encoding, in response to a determination that the overlap exists, a second message to configure the UE with a second measurement gap pattern corresponding to a measurement gap pattern that has a measurement gap length associated with one or more other NR data scheduling events; and the preferred RSTD measurement gap pattern is to be used by the UE during the PRS measurements, and the second measurement gap pattern to be used by the UE during the one or more other NR data scheduling events.

21. A method to be performed at one or more processors of a New Radio (NR) Node B (gNB), the method including: encoding for transmission to a user equipment (UE) a message to configure the UE with a measurement gap pattern for positioning reference signal (PRS) measurements; and setting a gap pattern length of a measurement gap corresponding to the measurement gap pattern depending on whether an overlap exists between a PRS to be measured and one or more other NR data scheduled to be received by the UE.

22. The method of claim 21, further including setting the gap pattern length to be greater than 6 ms in response to a determination that an overlap does not exists, and to be less than 6 ms in response to a determination that the overlap exists.

23. The method of claim 21, further including determining that the overlap exists, and in response to a determination that the overlap exists, overriding the measurement gap pattern for the PRS measurements by setting the gap pattern length to correspond to a gap pattern length associated with the one or more other NR data scheduled to be received by the UE.

24. The method of claim 21, wherein the measurement gap pattern for the PRS measurements corresponds to a shared measurement gap pattern that is shared between the PRS measurements and one or more other NR data scheduling events.

25. The method of claim 21, further including decoding a request from the UE including an indication of a preferred reference signal time difference (RSTD) measurement gap pattern, the preferred RSTD measurement gap pattern based on an inter-frequency PRS configuration message to the UE from a NR location positioning protocol server (LPP).

\* \* \* \* \*